US012647780B2

(12) United States Patent
    Kawana

(10) Patent No.:     US 12,647,780 B2
(45) Date of Patent:          Jun. 2, 2026

(54) COMMUNICATION APPARATUS, CONTROL METHOD FOR INFORMATION PROCESSING APPARATUS, AND CONTROL METHOD FOR SYSTEM

(71) Applicant: Canon Kabushiki Kaisha, Tokyo (JP)

(72) Inventor: Tomoyuki Kawana, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 348 days.

(21) Appl. No.: 18/299,124

(22) Filed: Apr. 12, 2023

(65) Prior Publication Data

US 2023/0336989 A1     Oct. 19, 2023

(30) Foreign Application Priority Data

Apr. 18, 2022     (JP) ................................. 2022-068467

(51) Int. Cl.
    *G06F 7/04*        (2006.01)
    *H04N 1/327*       (2006.01)
    *H04W 12/06*       (2021.01)
(52) U.S. Cl.
    CPC ........ *H04W 12/06* (2013.01); *H04N 1/32704* (2013.01); *H04N 2201/0041* (2013.01)
(58) Field of Classification Search
    CPC ...... H04W 12/06; G06F 21/335; G06F 21/35; G06F 21/44; H04L 63/10
    See application file for complete search history.

(56) References Cited

U.S. PATENT DOCUMENTS 9,043,873 B1 *   5/2015   Azem ................... H04W 12/50
                                                       713/155
2006/0286967 A1 * 12/2006  Lee .......................... H04M 3/38
                                                       455/411
                                (Continued)

FOREIGN PATENT DOCUMENTS

JP        2004274232 A      9/2004
JP        2008533802 A      8/2008
                                (Continued)

OTHER PUBLICATIONS

Lee et al, A Secure Wireless Lan Access Technique for Home Network, IEEE, May 10, 2006, pp. 818-822. (Year: 2006).*
                                (Continued)

*Primary Examiner* — Philip J Chea
*Assistant Examiner* — Jenise E Jackson
(74) *Attorney, Agent, or Firm* — Venable LLP

(57)                  ABSTRACT

The invention provides a communication apparatus communicable with an information processing apparatus, wherein the apparatus comprises a first transmission unit configured to transmit, to the information processing apparatus, information for displaying a setting screen for accepting an input of setting information concerning Extensible Authentication Protocol (EAP) authentication as authentication based on IEEE802.1X/EAP; a reception unit configured to receive, from the information processing apparatus, the setting information input to the setting screen; an attempt unit configured to attempt EAP authentication with a predetermined authentication server based on the setting information input to the setting screen; and a second transmission unit configured to transmit, based on a failure of the EAP authentication, information for displaying a screen based on the failure of the EAP authentication to the information processing apparatus.

18 Claims, 17 Drawing Sheets

(56) References Cited

U.S. PATENT DOCUMENTS

| | | | |
|---|---|---|---|
| 2011/0211444 A1 | 9/2011 | Das et al. | |
| 2011/0231902 A1* | 9/2011 | Nagasaki | H04W 12/069 |
| | | | 726/3 |
| 2012/0054839 A1* | 3/2012 | Friedlander | H04W 12/068 |
| | | | 726/5 |
| 2016/0112410 A1* | 4/2016 | Nedeltchev | H04L 63/0876 |
| | | | 713/156 |
| 2016/0323774 A1* | 11/2016 | Landais | H04W 12/065 |
| 2017/0199710 A1* | 7/2017 | Ando | G06F 3/1268 |

FOREIGN PATENT DOCUMENTS

| | | | |
|---|---|---|---|
| JP | 2008219457 A | 9/2008 | |
| JP | 2011197864 A | 10/2011 | |
| JP | 2016021090 A | 2/2016 | |
| JP | 2018133785 A | 8/2018 | |

OTHER PUBLICATIONS

Chrabaszcz et al, Fast Re-Authentication of Mobile Devices with EAP Re-Authentication Protocol (ERP), IEEE, Oct. 18, 2012, pp. 1-6. (Year: 2012).*

Latest Network Technologies Series, Part 9 IEEE 802.1X, "Authentication Technology for LANs, Both Wired and Wireless," Nikkei Byte, Sep. 2002.

Japanese Office Action dated Mar. 27, 2026 in counterpart Japanese Patent Appln. No. 2022-068467.

Transmittal of Non-Patent Literature dated Mar. 27, 2026 in counterpart Japanese Patent Appln. No. 2022-068467.

* cited by examiner

F I G. 1
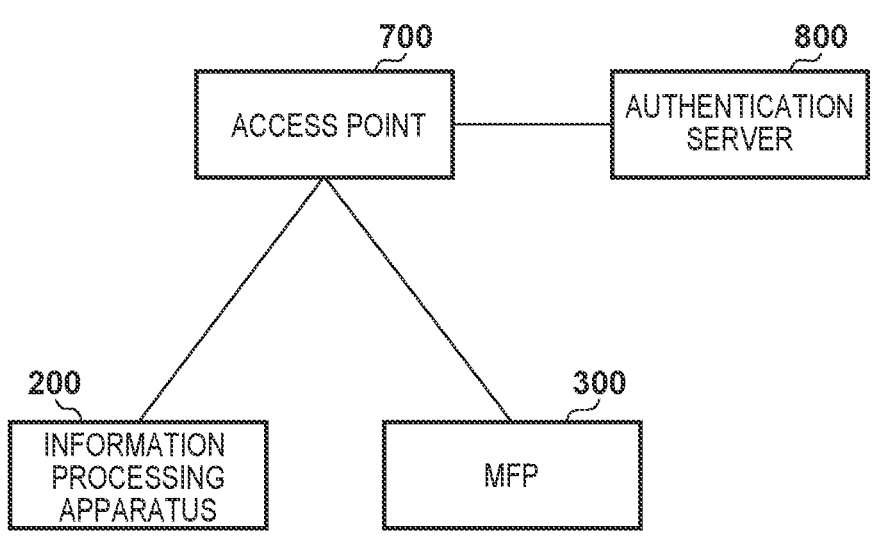
F I G. 2
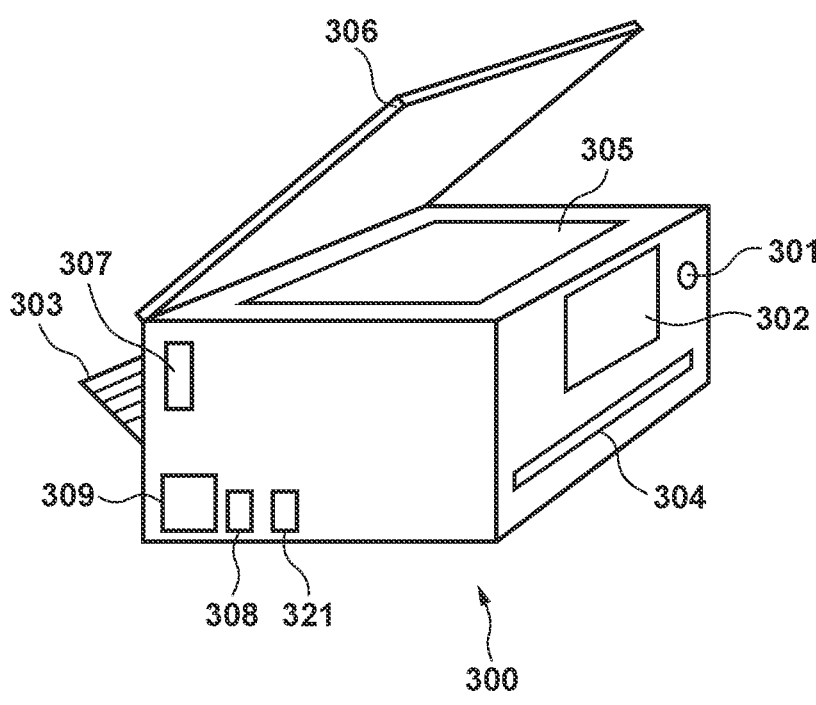

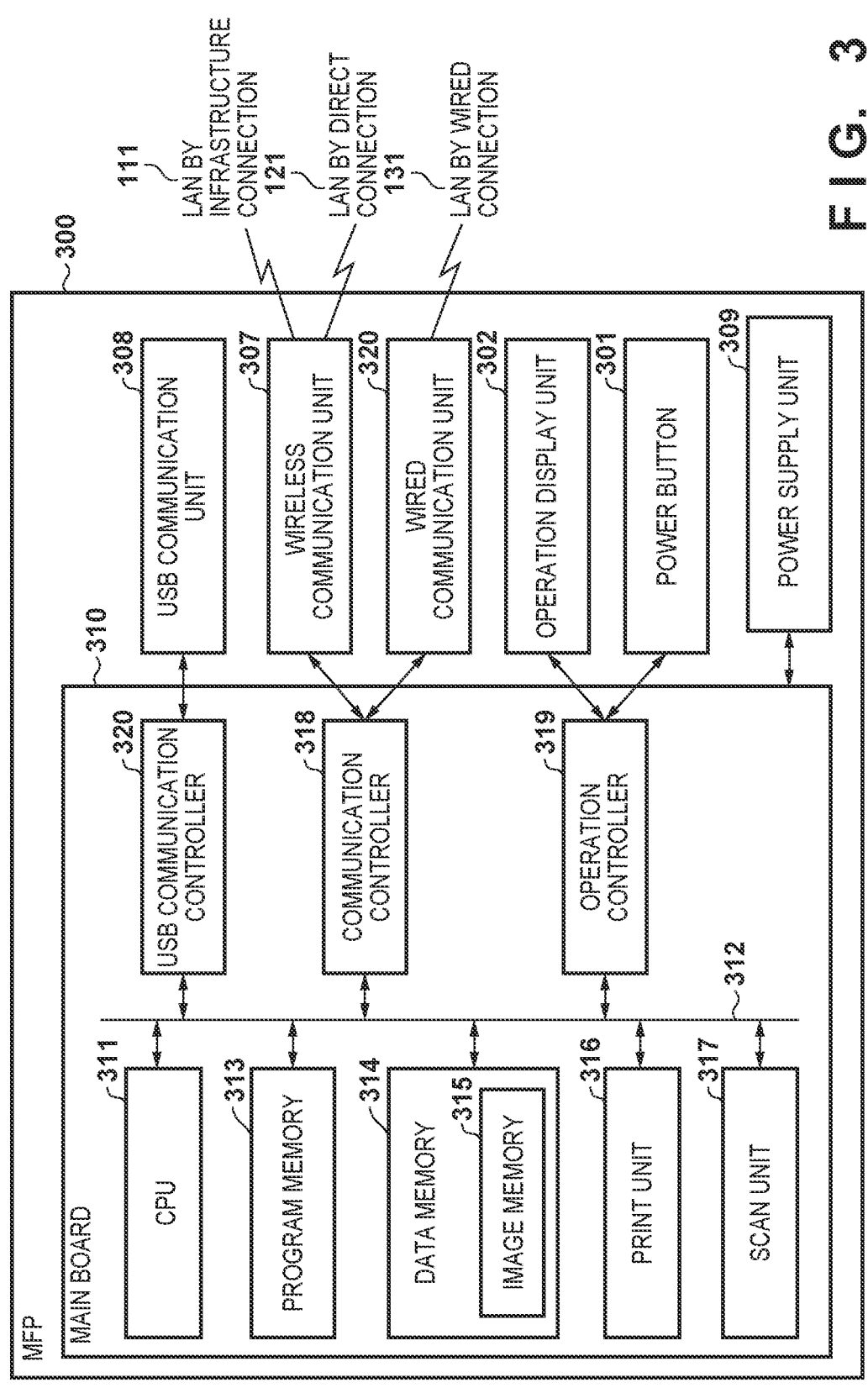
F I G. 3

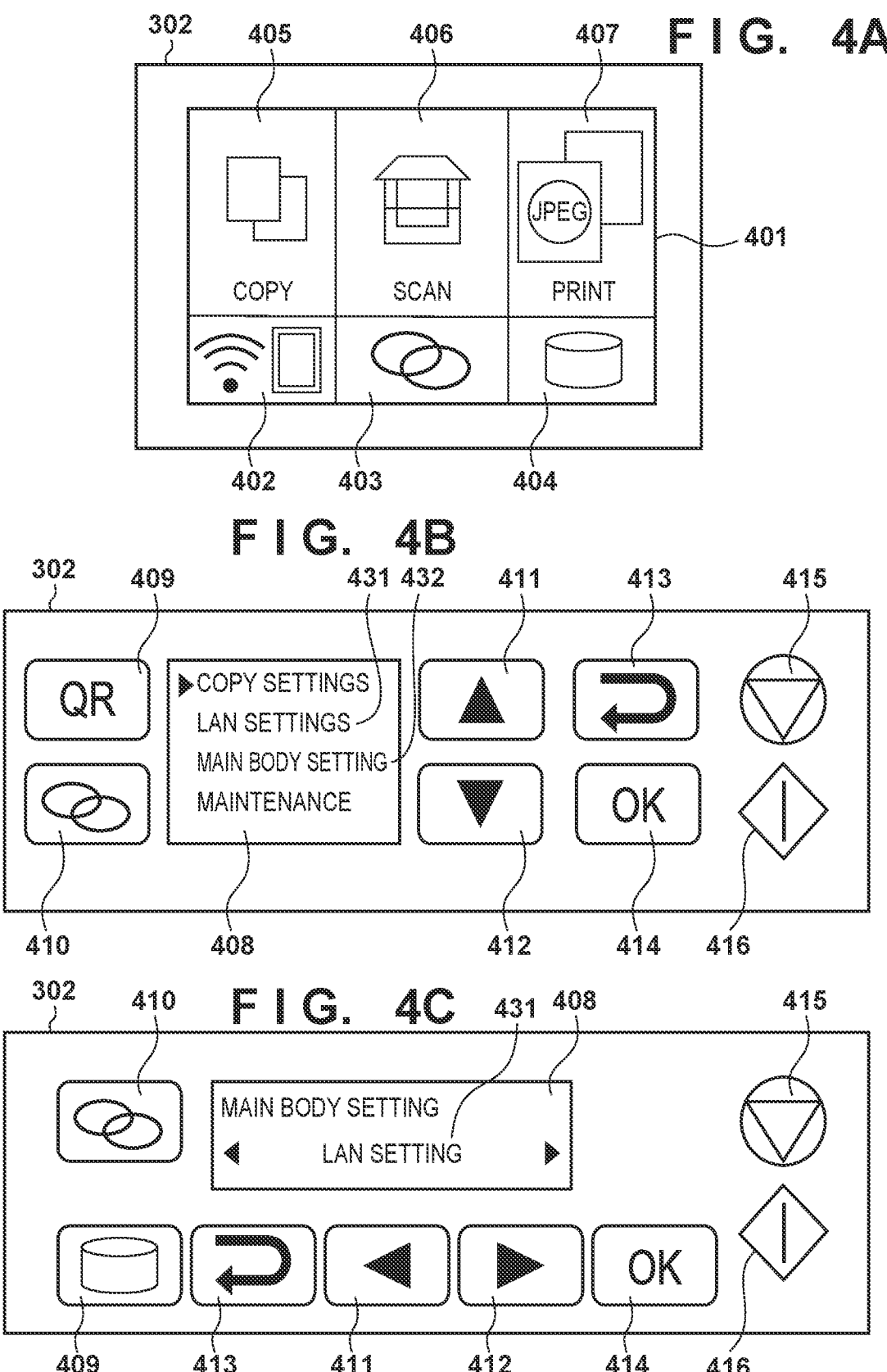
F I G. 4A
F I G. 4B
F I G. 4C

F I G. 6
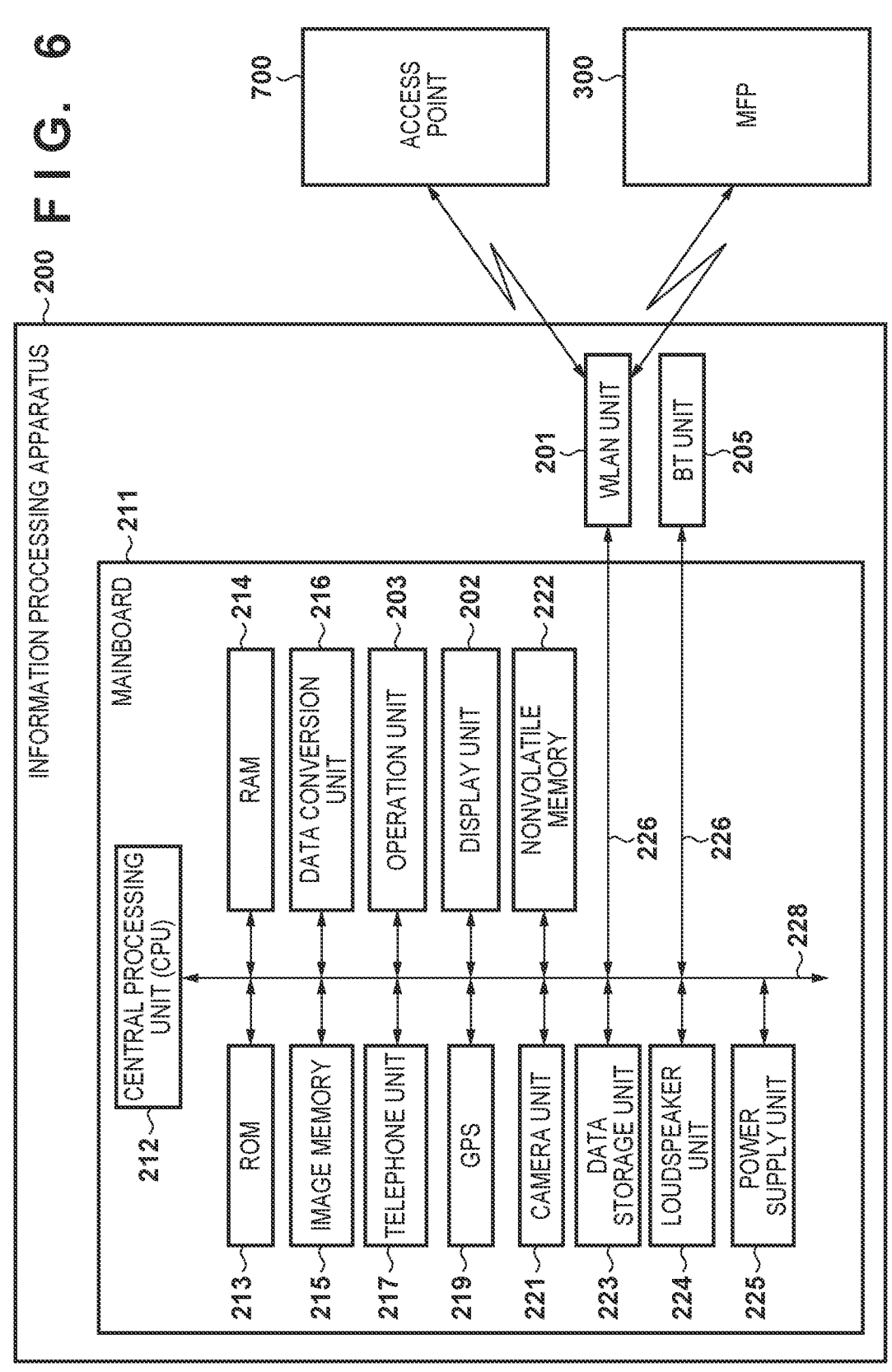

F I G. 7
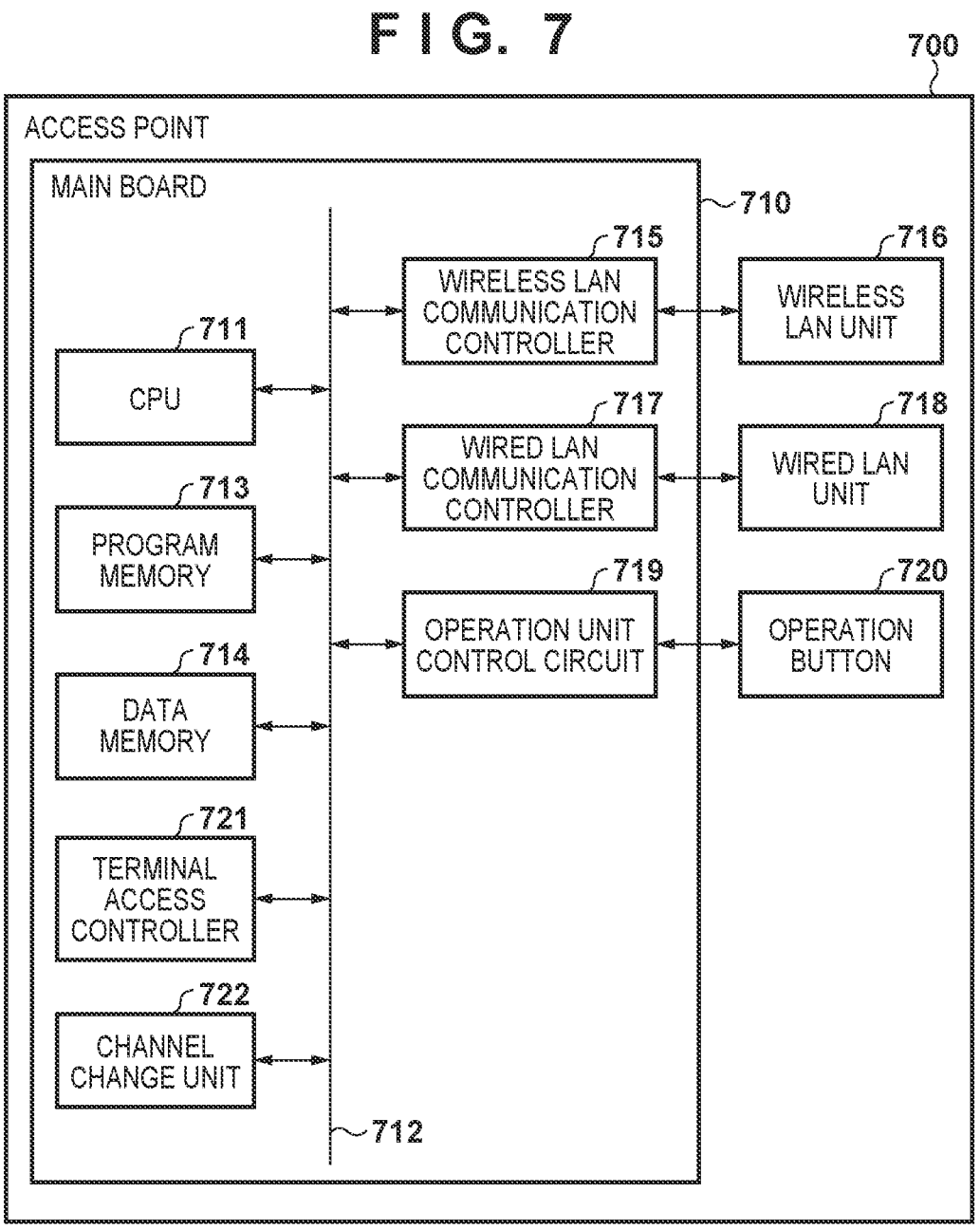

START

CONNECT BETWEEN PC AND MFP BY
COMMUNICATION METHOD
THAT IS NOT EAP ~ S901

SET INFORMATION USED DURING EAP
CONNECTION FROM PC TO MFP ~ S902

CONNECT MFP TO NETWORK IN WHICH
AP EAP IS ENABLED ~ S903

END

F I G. 11A

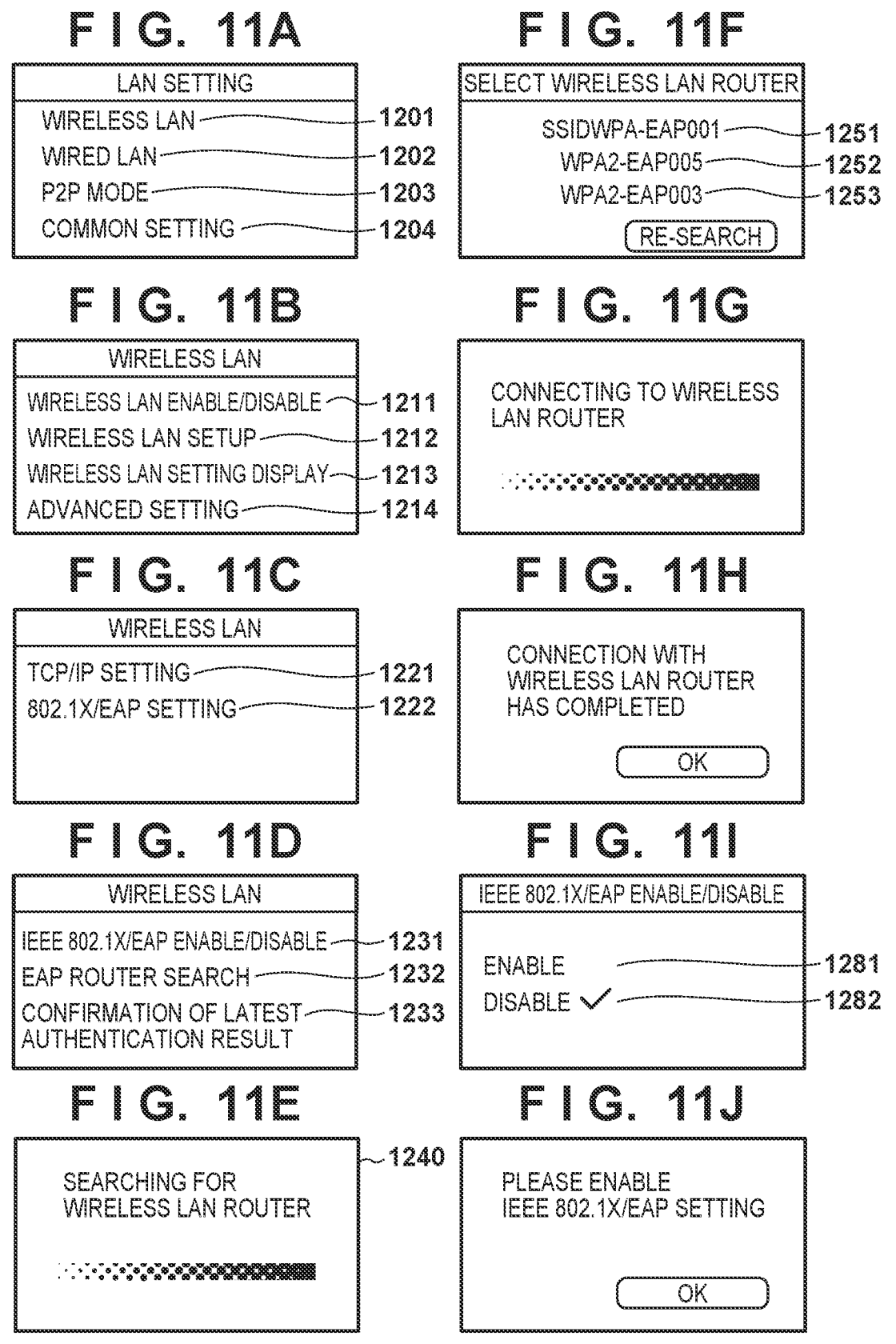

| LAN SETTING |
| --- |
| WIRELESS LAN — 1201 |
| WIRED LAN — 1202 |
| P2P MODE — 1203 |
| COMMON SETTING — 1204 |

F I G. 11B

| WIRELESS LAN |
| --- |
| WIRELESS LAN ENABLE/DISABLE — 1211 |
| WIRELESS LAN SETUP — 1212 |
| WIRELESS LAN SETTING DISPLAY — 1213 |
| ADVANCED SETTING — 1214 |

F I G. 11C

| WIRELESS LAN |
| --- |
| TCP/IP SETTING — 1221 |
| 802.1X/EAP SETTING — 1222 |

F I G. 11D

| WIRELESS LAN |
| --- |
| IEEE 802.1X/EAP ENABLE/DISABLE — 1231 |
| EAP ROUTER SEARCH — 1232 |
| CONFIRMATION OF LATEST — 1233 AUTHENTICATION RESULT |

F I G. 11E

~1240

SEARCHING FOR
WIRELESS LAN ROUTER

F I G. 11F

| SELECT WIRELESS LAN ROUTER |
| --- |
| SSIDWPA-EAP001 — 1251 |
| WPA2-EAP005 — 1252 |
| WPA2-EAP003 — 1253 |
| ( RE-SEARCH ) |

F I G. 11G

CONNECTING TO WIRELESS
LAN ROUTER

F I G. 11H

CONNECTION WITH
WIRELESS LAN ROUTER
HAS COMPLETED ( OK )

F I G. 11I

| IEEE 802.1X/EAP ENABLE/DISABLE |
| --- |
| ENABLE — 1281 |
| DISABLE ✓ — 1282 |

F I G. 11J

PLEASE ENABLE
IEEE 802.1X/EAP SETTING ( OK )

FIG. 12A

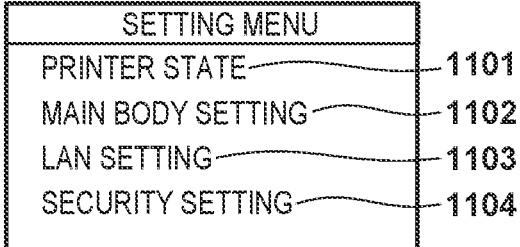

| SETTING MENU | |
|---|---|
| PRINTER STATE | 1101 |
| MAIN BODY SETTING | 1102 |
| LAN SETTING | 1103 |
| SECURITY SETTING | 1104 |

FIG. 12E

| KEY AND CERTIFICATE SETTING | |
|---|---|
| KEY AND CERTIFICATE UPLOAD | 1141 |
| DELETE KEY AND CERTIFICATE | 1142 |
| CONFIRMATION OF KEY AND CERTIFICATE | 1143 |

FIG. 12B

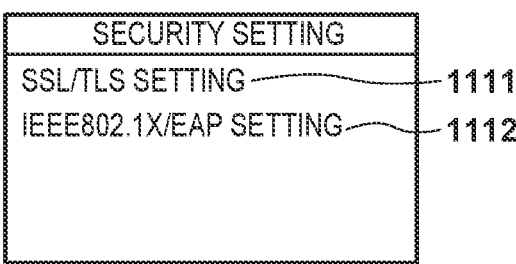

| SECURITY SETTING | |
|---|---|
| SSL/TLS SETTING | 1111 |
| IEEE802.1X/EAP SETTING | 1112 |

FIG. 12F

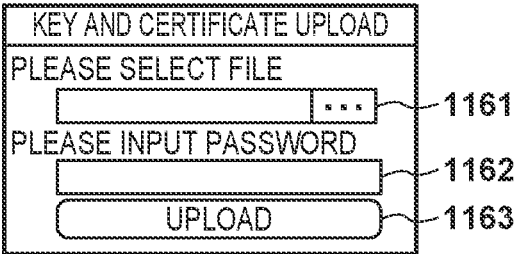

| KEY AND CERTIFICATE UPLOAD | |
|---|---|
| PLEASE SELECT FILE | |
| [ · · · ] | 1161 |
| PLEASE INPUT PASSWORD | |
| [ ] | 1162 |
| UPLOAD | 1163 |

FIG. 12C

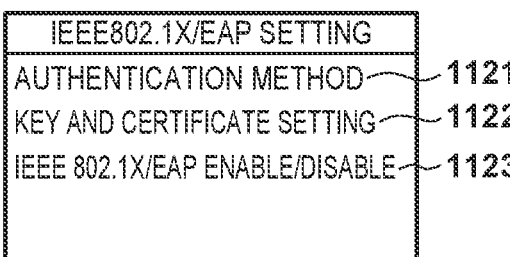

| IEEE802.1X/EAP SETTING | |
|---|---|
| AUTHENTICATION METHOD | 1121 |
| KEY AND CERTIFICATE SETTING | 1122 |
| IEEE 802.1X/EAP ENABLE/DISABLE | 1123 |

FIG. 12G

| IEEE 802.1X/EAP ENABLE/DISABLE | |
|---|---|
| ENABLE | |
| DISABLE ✓ | |
| OK | |

FIG. 12D

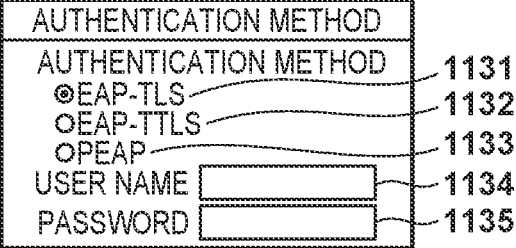

| AUTHENTICATION METHOD | |
|---|---|
| AUTHENTICATION METHOD | 1131 |
| ⊙EAP-TLS | 1132 |
| ◯EAP-TTLS | 1133 |
| ◯PEAP | |
| USER NAME [ ] | 1134 |
| PASSWORD [ ] | 1135 |

F I G. 12H

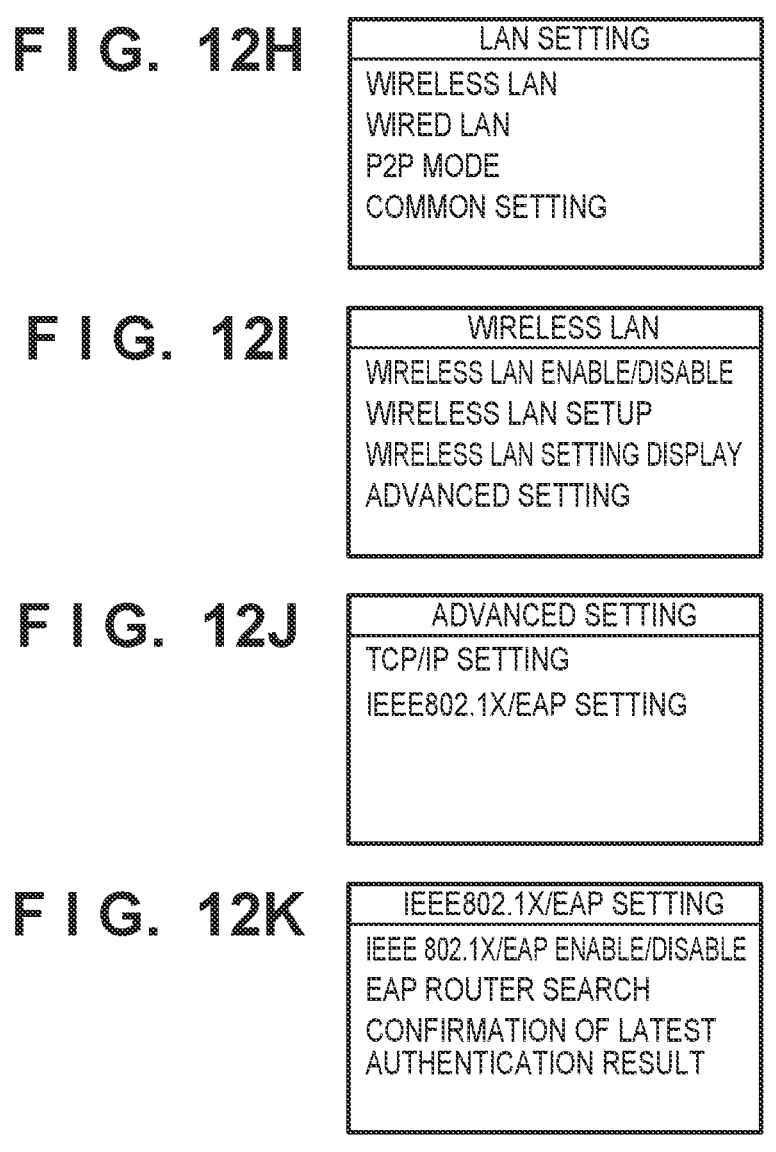

| LAN SETTING |
|---|
| WIRELESS LAN |
| WIRED LAN |
| P2P MODE |
| COMMON SETTING |

F I G. 12I

| WIRELESS LAN |
|---|
| WIRELESS LAN ENABLE/DISABLE |
| WIRELESS LAN SETUP |
| WIRELESS LAN SETTING DISPLAY |
| ADVANCED SETTING |

F I G. 12J

| ADVANCED SETTING |
|---|
| TCP/IP SETTING |
| IEEE802.1X/EAP SETTING |

F I G. 12K

| IEEE802.1X/EAP SETTING |
|---|
| IEEE 802.1X/EAP ENABLE/DISABLE |
| EAP ROUTER SEARCH |
| CONFIRMATION OF LATEST AUTHENTICATION RESULT |

F I G. 13A
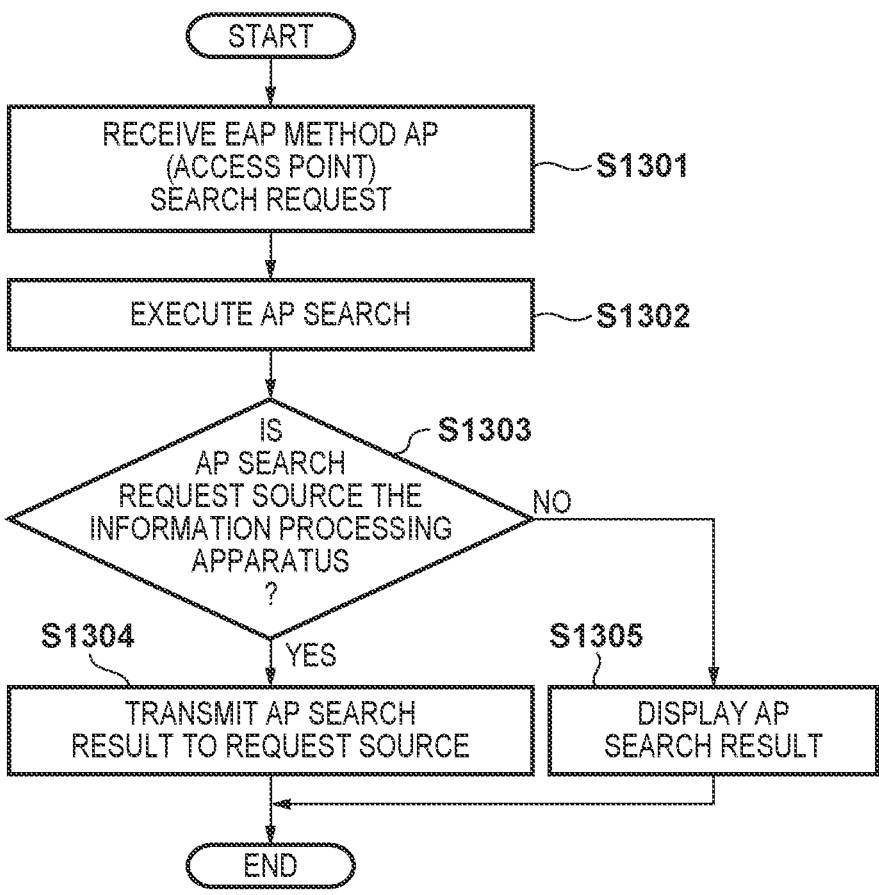

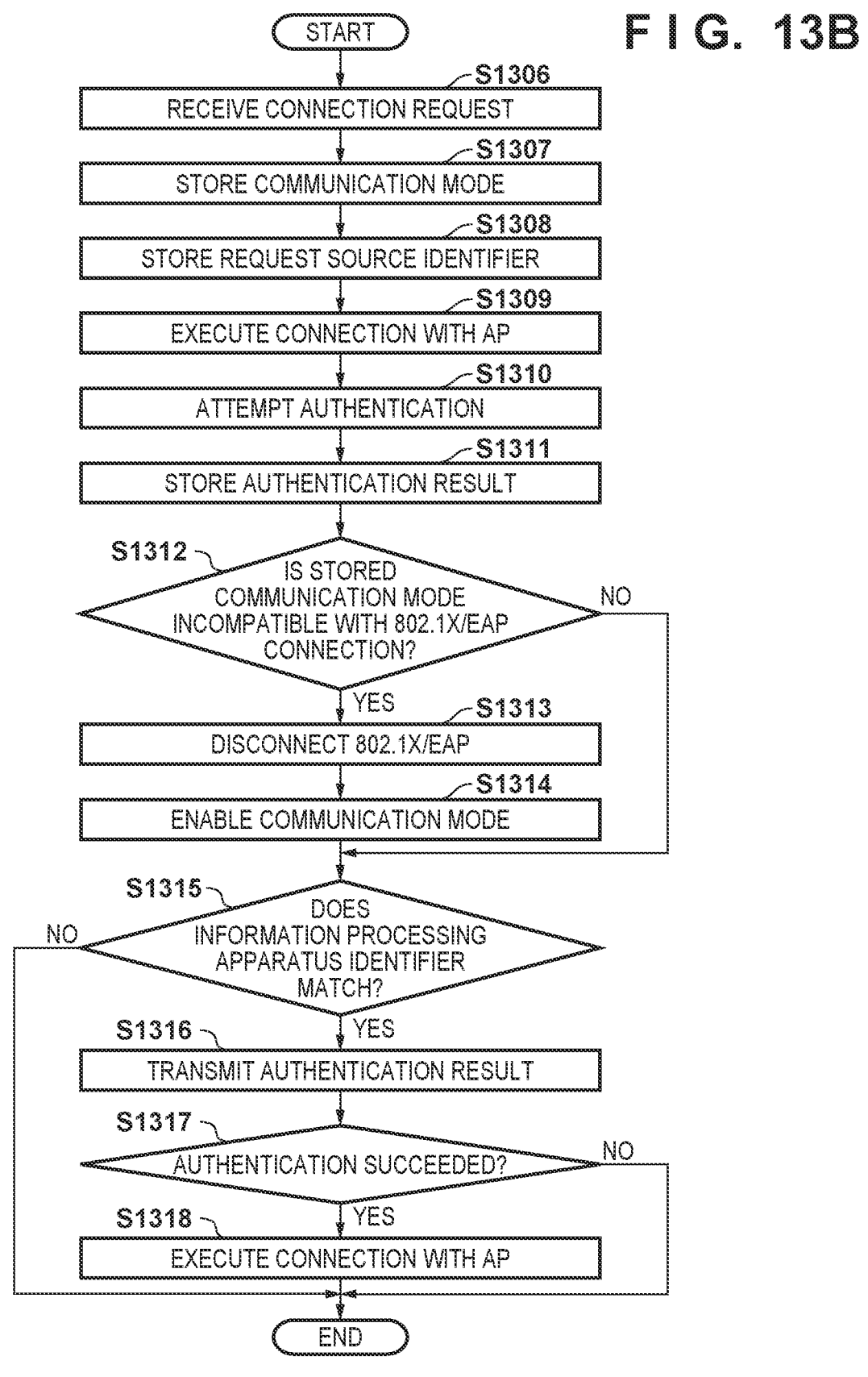
F I G. 13B

F I G. 14A

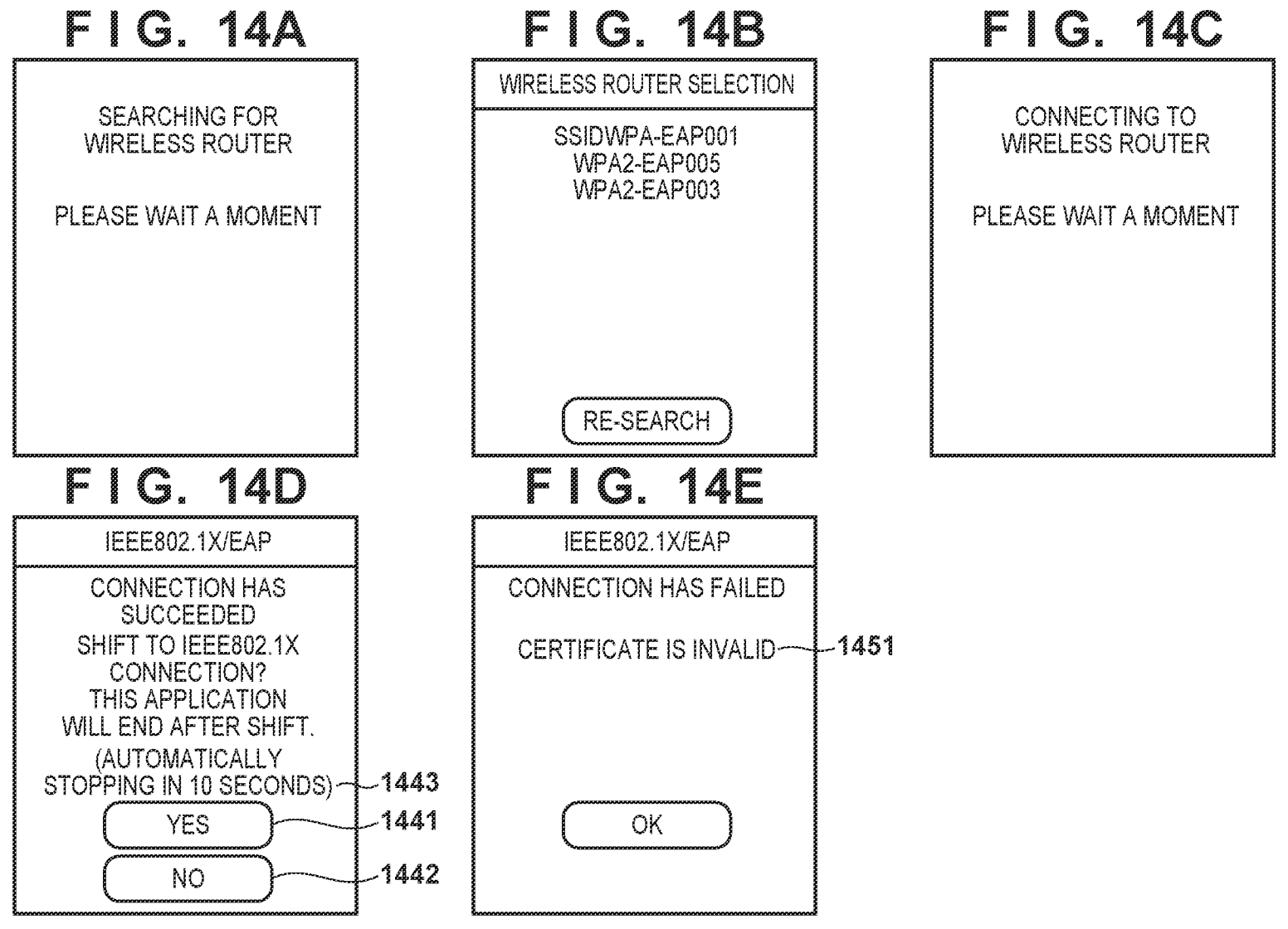

SEARCHING FOR
WIRELESS ROUTER

PLEASE WAIT A MOMENT

F I G. 14B

WIRELESS ROUTER SELECTION

SSIDWPA-EAP001
WPA2-EAP005
WPA2-EAP003

RE-SEARCH

F I G. 14C

CONNECTING TO
WIRELESS ROUTER

PLEASE WAIT A MOMENT

F I G. 14D

IEEE802.1X/EAP

CONNECTION HAS
SUCCEEDED
SHIFT TO IEEE802.1X
CONNECTION?
THIS APPLICATION
WILL END AFTER SHIFT.
(AUTOMATICALLY
STOPPING IN 10 SECONDS)

1443

YES — 1441

NO — 1442

F I G. 14E

IEEE802.1X/EAP

CONNECTION HAS FAILED

CERTIFICATE IS INVALID — 1451

OK

F I G. 15
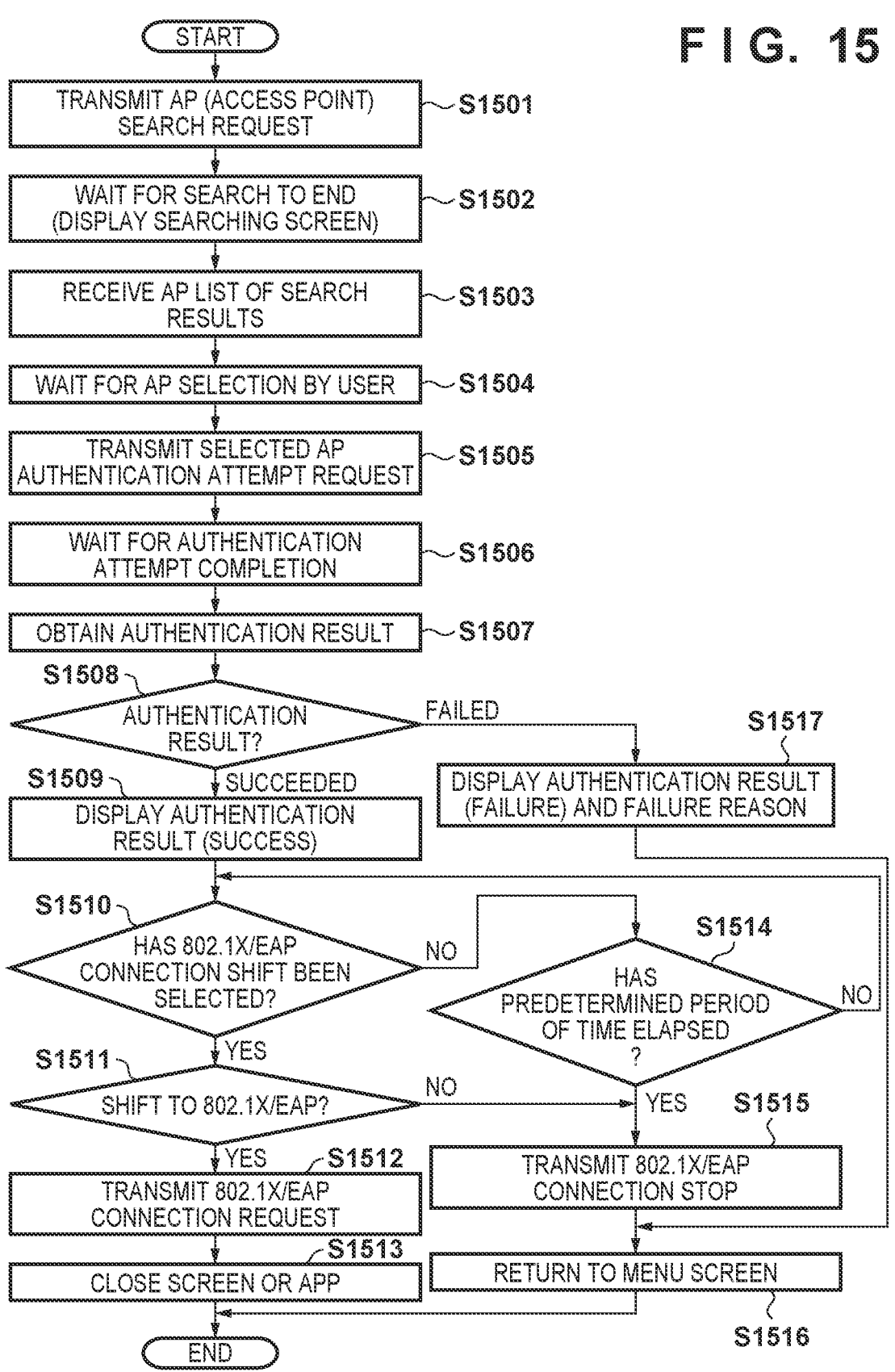

F I G. 16

| ID | STATE | MESSAGE |
|----|-------|---------|
| 1 | AUTHENTICATION PROCESSING HAS NOT BEEN PERFORMED | AUTHENTICATION PROCESSING HAS NOT STARTED |
| 2 | AUTHENTICATION SUCCEEDED | AUTHENTICATION HAS SUCCEEDED |
| 3 | AUTHENTICATING | PERFORMING AUTHENTICATION PROCESSING |
| 4 | CA CERTIFICATE OR CLIENT CERTIFICATION IN PRINTER IS DEFICIENT | CERTIFICATE IS INVALID |
| 5 | SERVER CERTIFICATE EXPIRED | CERTIFICATE OF AUTHENTICATION SERVER IS EXPIRED |
| 6 | CLIENT AUTHENTICATION ERROR HAS OCCURRED | PLEASE SET CORRECT AUTHENTICATION INFORMATION |
| 7 | AUTHENTICATION METHOD MISMATCH HAS OCCURRED | PLEASE CONFIRM AUTHENTICATION METHOD SETTING |
| 8 | INTERNAL ERROR DURING AUTHENTICATION PROCESSING HAS OCCURRED | ERROR HAS OCCURRED FOR SOME REASON |

COMMUNICATION APPARATUS, CONTROL METHOD FOR INFORMATION PROCESSING APPARATUS, AND CONTROL METHOD FOR SYSTEM

BACKGROUND OF THE INVENTION

Field of the Invention

The present invention relates to a communication apparatus, a control method for an information processing apparatus, and a control method for a system.

Description of the Related Art

Some of communication apparatuses that execute processing of executing connection to an access point execute connection by selecting an access point based on a Service Set Identifier (SSID) list. Japanese Patent Laid-Open No. 2004-274232 discloses this technique. The SSID list is acquired by searching for connectable access points.

In a communication method using a wireless LAN complying with a predetermined standard, a network can be protected by authenticating a communication apparatus to be connected to the network. A typical example of the standard is the Institute of Electrical and Electronics Engineers (IEEE) 802.11 standard. Examples of an authentication method are a Pre Shared Key (PSK) method using a PSK, and a Simultaneous Authentication of Equals (SAE) method using an SAE. Another example is an Extensible Authentication Protocol (EAP) method of authenticating a communication apparatus to be connected to a network using an authentication server complying with IEEE802.1X/EAP.

As an apparatus that executes connection processing to a wireless LAN using the IEEE802.1X/EAP authentication method becomes more widespread, it is required, in a communication apparatus that executes the connection processing to a wireless LAN using the IEEE802.1X/EAP authentication method, to improve convenience relating to an apparatus that transmits information for the connection processing.

SUMMARY OF THE INVENTION

The present invention provides a technique for improving, in a communication apparatus that executes connection processing to a wireless LAN using the IEEE802.1X/EAP authentication method, convenience relating to an apparatus that transmits information for the connection processing.

According to an aspect of the invention, there is provided a communication apparatus communicable with an information processing apparatus, comprising: a first transmission unit configured to transmit, to the information processing apparatus, information for displaying a setting screen for accepting an input of setting information concerning Extensible Authentication Protocol (EAP) authentication as authentication based on IEEE802.1X/EAP; a reception unit configured to receive, from the information processing apparatus, the setting information input to the setting screen; an attempt unit configured to attempt EAP authentication with a predetermined authentication server based on the setting information input to the setting screen; and a second transmission unit configured to transmit, based on a failure of the EAP authentication, information for displaying a screen based on the failure of the EAP authentication to the information processing apparatus.

According to the present invention, it is possible to improve, in a communication apparatus that executes connection processing to a wireless LAN using the IEEE802.1X/EAP authentication method, convenience relating to an apparatus that transmits information for the connection processing.

Further features of the present invention will become apparent from the following description of exemplary embodiments with reference to the attached drawings.

BRIEF DESCRIPTION OF THE DRAWINGS

FIG. 1 is a block diagram showing an example of a system configuration;

FIG. 2 is a view showing an example of the outer appearance of an MFP;

FIG. 3 is a block diagram showing an example of the arrangement of the MFP;

FIGS. 4A to 4C are views each showing an example of a screen displayed on the operation display unit of the MFP;

FIG. 6 is a block diagram showing an example of the arrangement of the information processing apparatus;

FIG. 7 is a block diagram showing an example of the arrangement of an access point;

FIGS. 11A to 11J are views each showing an example of a screen displayed when LAN setting is performed on the operation display unit of the MFP;

FIGS. 12A to 12K are views each showing an example of an MFP setting screen displayed on the information processing apparatus;

FIGS. 13A and 13B are flowcharts illustrating processing of the MFP;

FIGS. 14A to 14E are views each showing an example of a screen displayed on the information processing apparatus;

FIG. 15 is a flowchart illustrating processing of the information processing apparatus; and FIG. 16 is a table showing an example of a corresponding table indicating an authentication result and a display message.

DESCRIPTION OF THE EMBODIMENTS

Figure 5:
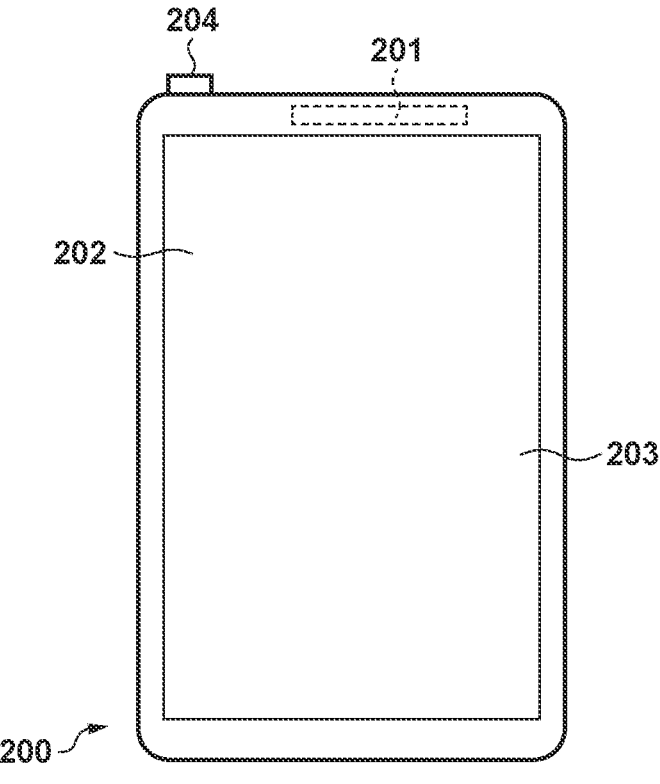
FIG. 5 is a view showing an example of the outer appearance of an information processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

[System Configuration]

FIG. 1 shows an example of the configuration of a communication system according to this embodiment. As one example, this system is formed by a plurality of communication apparatuses that can wirelessly communicate with each other. Assume here that, as the plurality of communication apparatuses, an information processing apparatus 200, a Multi Function Printer (MFP) 300, an access point 700, and an authentication server 800 exist.

Note that if any discrimination is not particularly needed, the information processing apparatus 200 and the MFP 300 can simply be represented as communication apparatuses. For example, the MFP 300 may be represented as the communication apparatus 300.

The information processing apparatus 200 is an information processing apparatus having a communication function by a wireless LAN, a wired LAN, or the like. The wireless LAN can be represented as a WLAN (Wireless LAN). Examples of the information processing apparatus 200 are a smartphone, a notebook personal computer (notebook PC (multi function peripheral)), a tablet terminal, and a Personal Digital Assistant (PDA).

The MFP 300 is an apparatus having a printing function as a main function. In addition, the MFP 300 can have sub-functions such as a document reading function (scan function), a facsimile (FAX) function, and a telephone function. The MFP 300 has a communication function capable of wirelessly communicating with the information processing apparatus 200. In this embodiment, as one example, a case in which the MFP 300 is used will be described but the present invention is not limited to this. For example, instead of the MFP 300, a facsimile, a scanner, a projector, a portable terminal, a smartphone, a notebook PC, a tablet terminal, a PDA, or the like may be used. Alternatively, a digital camera, a music reproduction device, a television, a smart speaker, Augmented Reality (AR) glasses, or the like may be used. For example, the MFP 300 receives print data including image data from the information processing apparatus connected via the access point 700, and forms an image based on the data. Alternatively, for example, the MFP 300 transmits image data read by the scan function to the information processing apparatus connected via the access point 700. Other control information and the like can be exchanged with the network connected via the access point 700.

The access point (AP) 700 is provided separately from (outside) the information processing apparatus 200 and the MFP 300, and operates as a base station apparatus or wireless base station of a WLAN. A communication apparatus having a WLAN communication function can perform communication in a WLAN infrastructure mode (wireless infrastructure mode) via the access point 700. The access point 700 wirelessly communicates with a communication apparatus (that is, an authenticated communication apparatus) that is permitted to execute connection to the self-apparatus, and relays wireless communication between the communication apparatus and another communication apparatus. The access point 700 can be connected to, for example, a wired communication network to relay communication between a communication apparatus connected to the wired communication network and another communication apparatus wirelessly connected to the access point 700.

If the authentication method of a network created by the access point 700 is a method using the authentication server 800, the access point 700 performs access control by authenticating, in cooperation with the authentication server 800, a communication apparatus to be connected to the network. A communication apparatus to be connected to the network created by the access point 700 can be restricted in terms of communication with an apparatus other than the authentication server 800 until it is authenticated. Note that the access point 700 may support an authentication method not using the authentication server. The authentication method using the authentication server and the authentication method not using the authentication server will be described in detail later.

The authentication server (Radius server) 800 is provided separately from the information processing apparatus 200, the MFP 300, and the access point 700, and comprehensively manages authentication information. The authentication server 800 can execute authentication processing complying with, for example, the IEEE802.1X standard. In this embodiment, the authentication server 800 authenticates, in cooperation with the access point 700, a terminal including the information processing apparatus 200 to be authenticated, and performs access control of the terminal based on an authentication result.

The access point 700 corresponds to an authenticator in IEEE802.1X. Furthermore, the information processing apparatus 200 and the MFP 300 correspond to supplicants in IEEE802.1X. The authentication server 800 corresponds to an authentication server in IEEE802.1X.

The authentication server 800 performs authentication by, for example, the EAP-Transport Layer Security (TLS) method or EAP-Tunneled TLS (TTLS) method in the IEEE802.1X standard. The EAP-TLS method is an authentication method using the TLS handshake protocol, and can perform authentication using a server certificate, a client certificate, and the like. The EAP-TTLS method is an authentication method using the TLS handshake protocol, and can perform authentication using a server certificate, a user name, a password, and the like. As another example, the authentication server 800 can perform authentication by the Protected EAP (PEAP) method in the IEEE802.1X standard. In the Protected EAP (PEAP) method, it is possible to perform authentication using a user name and a password. The information used for IEEE802.1X authentication can be expressed as "authentication information".

The information processing apparatus 200 and the MFP 300 can perform wireless communication in a peer-to-peer (P2P) mode without intervention of the external access point 700 or in the wireless infrastructure mode via the external access point 700 using their WLAN communication functions. The P2P mode includes a Wi-Fi Direct® (WFD) mode and a software AP mode. That is, the above communication is implemented by Wireless Direct complying with the IEEE802.11 series. Note that the information processing apparatus 200 and the MFP 300 can execute processing corresponding to a plurality of print services using WLAN communication, as will be described in detail later.

[Outer Appearance of MFP]

FIG. 2 is a perspective view showing an example of the outer appearance of the MFP 300. The MFP 300 includes an operation display unit (operation panel) 302, a print sheet insertion port 303, a print sheet discharge port 304, a document table 305, and a document cover 306. In the housing of the MFP 300, a hard key used to turn on and off the power is provided as a power button 301. The operation display unit 302 includes a display and buttons used to operate the MFP 300. For example, the operation display unit 302 includes a plurality of keys such as character input keys, cursor keys, an enter key, and a cancel key and a light source such as a Light Emitting Diode (LED) or a Liquid Crystal Display (LCD). The operation display unit 302 is configured to accept a user operation input when activating each function of the MFP 300 or changing various settings. A touch panel display can typically be used as the operation display unit 302 (see FIGS. 4A to 4C).

The print sheet insertion port 303 is an insertion port for setting sheets of an arbitrary size. Sheets set at the print sheet insertion port 303 are conveyed one by one to a print unit, undergo printing, and are discharged from the print sheet discharge port 304. The document table 305 is a transparent glass table and is used to set a document and read an image using the scan function. The document cover 306 is a cover for pressing a document against the document table so as not to float from the document table 305 when reading the image using the scan function. Furthermore, the document cover 306 prevents external light from entering the main body of the MFP 300.

The MFP 300 has a communication function by the WLAN or wired LAN. In this embodiment, the MFP 300 incorporates an antenna for implementing wireless communication, and is provided with a communication unit 321 for the wired LAN. The MFP 300 is provided with a USB communication unit 309 that can implement communication with the external information processing apparatus 200 or the like by USB connection.

[Internal Arrangement of MFP]

FIG. 3 is a block diagram showing an example of the arrangement of the MFP 300. The MFP 300 incorporates a main board 310 that controls the overall apparatus, and further includes a wireless communication unit 307 and a USB communication unit 308. The main board 310 includes a Central Processing Unit (CPU) 311, an internal bus 312, a program memory 313, a data memory 314, a print unit 316, a scan unit 317, a communication controller 318, an operation controller 319, and a USB communication controller 320. Note that processing to be explained below as processing executed by the MFP 300 is actually implemented when the CPU 311 executes a program stored in the program memory 313, the data memory 314, or the like.

Assume that the CPU 311, the program memory 313, and the data memory 314 are a microprocessor, a Read Only Memory (ROM), and a Random Access Memory (RAM), respectively. In this embodiment, the CPU 311, the program memory 313, and the data memory 314 are connected to each other via a bus cable forming the internal bus 312. Based on a control program stored in the program memory 313 and contents in the data memory 314, the CPU 311 performs calculation processing for implementing each function described in this embodiment.

For example, the CPU 311 can control the scan unit 317 to read a document and store the image (image data) in an image memory 315 in the data memory 314. The CPU 311 can control the print unit 316 to print, on a recording medium, the image stored in the image memory 315. The CPU 311 can control the USB communication unit 308 via the USB communication controller 320 to perform USB communication by USB connection to the external information processing apparatus 200. The CPU 311 can control the operation controller 319 to receive information indicated by an operation input from the operation display unit 302 or the power button 301. The CPU 311 can also control the operation controller 319 to display the state of the MFP 300 or a function selection menu on the operation display unit 302.

The wireless communication unit 307 is configured to provide the WLAN communication function, and provides, for example, the same function as that of the WLAN unit 201 of the information processing apparatus 200. That is, the wireless communication unit 307 transmits, to another device, packets converted from data in a form complying with a predetermined standard, and also reconstructs packets from another device into original data and outputs the data to the CPU 311. The wireless communication unit 307 is configured to execute data (packet) communication in the WLAN system complying with the IEEE802.11 standard series (IEEE802.11a/b/g/n/ac/ax and the like) but a WLAN system complying with another standard may be possible. In this example, assume that the wireless communication unit 307 can perform communication using a channel in one of the 2.4- and 5-GHz frequency bands. As will be described in detail later, the wireless communication unit 307 can further execute WFD-based communication, communication in the software access point (software AP) mode, communication in the wireless infrastructure mode, and the like. Furthermore, the information processing apparatus 200 and the MFP 300 can perform WFD-based Wireless Direct communication, and the wireless communication unit 307 can have a software AP function or a group owner function. That is, the wireless communication unit 307 can create a P2P communication network, and decide a channel to be used for P2P communication.

A wired communication unit 322 is configured to implement wired communication. For example, the wired communication unit 322 can implement data (packet) communication in a wired LAN (Ethernet) system complying with the IEEE802.3 series. Furthermore, in wired communication using the wired communication unit 322, it is possible to perform communication in a wired mode. In this example, the wired communication unit 322 is connected to the main board 310 via the bus cable forming the internal bus 312.

[Operation Display Unit of MFP]

FIGS. 4A to 4C each schematically show an example of the arrangement of the operation display unit 302 of the MFP 300.

FIG. 4A shows a display example in a case in which the MFP 300 adopts a touch panel display 401 as the operation display unit 302.

The user can activate the MFP 300 by touching the power button 301. After the activation of the MFP 300, a home screen (typically, the top layer of a menu) is displayed, on the touch panel display 401, as a screen to which the user can input an operation.

The home screen includes a copy region 405, a scan region 406, and a print region 407. The copy region 405 accepts a copy processing execution instruction. The scan region 406 accepts a scan processing execution instruction. The print region 407 accepts a print processing execution instruction.

The home screen can further include a state display region 402, a connection setting mode region 403, and a setting region 404. The state display region 402 indicates the settings and connection state of infrastructure connection, P2P connection, or the like of the MFP 300. With the connection setting mode region 403, the user can start an operation in the connection setting mode at an arbitrary timing. Furthermore, the user can change various settings using the setting region 404.

FIG. 4B shows an example in a case in which the MFP 300 adopts a relatively small LCD display 408 and various hard keys 409 to 416 as the operation display unit 302.

After the activation of the MFP 300, a home screen is displayed on the LCD display 408. The user can operate a cursor displayed on the LCD display 408 by pressing the cursor move button 411 or 412. When executing the operation, the user presses the OK button 414. When returning to an immediately preceding menu screen, the user presses the return button 413. By pressing the QR button 409, QR Code® including information necessary for P2P connection to the MFP 300 can be displayed. Note that the code displayed here is not limited to QR Code, and any two-dimensional code can be used. By reading this QR code from the camera unit or the like of the information processing apparatus 200, the information processing apparatus 200 and the MFP 300 can be P2P-connected to perform wireless communication. By pressing the connection setting mode button 410, the connection setting mode can be started, and the MFP 300 can be connected to the access point 700 by transmitting connection information to the MFP 300 using the information processing apparatus 200. If the stop button 415 is pressed while the MFP 300 executes various processes, the various processes are canceled. By pressing the copy start button 416, the user can scan a document to execute printing by the MFP 300.

As shown in FIG. 4C, the layout shown in FIG. 4B may be changed appropriately. For example, a cursor operation may be performed in the left-and-right direction. Note that the above-described elements 408 to 416 may simply be referred to as screens. For example, the LCD display 408 can be referred to as the screen 408.

[Outer Appearance of Information Processing Apparatus]

FIG. 5 shows an example of the outer appearance of the information processing apparatus 200. In this embodiment, the information processing apparatus 200 is assumed to be a smartphone, and includes a display unit 202, an operation unit 203, and a power key 204. The power key 204 is provided as a hard key used to turn on or off the power of the information processing apparatus 200. The display unit 202 is a display including an LCD type display mechanism in this embodiment but may display information using an LED or the like as another embodiment. Furthermore, the information processing apparatus 200 may have a function of outputting information by an audio in addition to or instead of the display unit 202. The operation unit 203 includes hard keys such as keys and buttons or a touch panel, and can be configured to detect a user operation input.

The information processing apparatus 200 according to this embodiment includes a touch panel display having both the function of the display unit 202 and that of the operation unit 203. In this case, for example, button icons and a software keyboard are displayed using the function of the display unit 202, and user operation inputs for them are detected by the function of the operation unit 203. As another embodiment, the display unit 202 and the operation unit 203 may be provided as individual hardware components.

Furthermore, the information processing apparatus 200 can incorporate a WLAN unit 201 that can provide a WLAN communication function. The WLAN unit 201 is configured to execute data (packet) communication in the WLAN system complying with, for example, the IEEE802.11 standard series (IEEE802.11a/b/g/n/ac/ax and the like). The WLAN unit 201 may be able to execute communication in a WLAN system complying with another standard. In this example, assume that the WLAN unit 201 can perform communication in both the 2.4- and 5-GHz frequency bands. As will be described in detail later, the WLAN unit 201 can execute WFD-based communication, communication in the software AP mode, communication in the wireless infrastructure mode, and the like.

[Internal Arrangement of Information Processing Apparatus]

FIG. 6 is a block diagram of the arrangement of the information processing apparatus 200. The information processing apparatus 200 includes a main board 211 that performs main control of the self-apparatus, the WLAN unit 201 that performs WLAN communication, and a Bluetooth® (BT) unit 205.

In this embodiment, the main board 211 includes a CPU 212, a ROM 213, a RAM 214, an image memory 215, and a data conversion unit 216. The main board 211 further includes a telephone unit 217, a Global Positioning System (GPS) 219, a camera unit 221, a nonvolatile memory 222, a data storage unit 223, a loudspeaker unit 224, and a power supply unit 225. These functional units in the main board 211 are connected to each other via a system bus 228, and managed by the CPU 212. The main board 211 and the WLAN unit 201, and the main board 211 and the BT unit 205 are connected via dedicated buses 226, respectively.

The CPU 212 functions as a system controller that controls each element of the information processing apparatus 200. The exemplified functions of the information processing apparatus 200 and processing to be described below as processing executed by the information processing apparatus 200 are implemented when the CPU 212 loads programs stored in the ROM 213 into the RAM 214 and executes them.

More specifically, the ROM 213 stores control programs to be executed by the CPU 212, an embedded operating system (OS) program, and the like. The CPU 212 executes a corresponding program under the embedded OS, thereby performing software control such as scheduling or task switching. The RAM 214 is implemented by a Static RAM (SRAM) or the like. The RAM 214 stores various data such as program control variables, setting values registered by the user, and management data for managing the information processing apparatus 200. The RAM 214 can be used as various work buffers. The image memory 215 is implemented by a memory such as a Dynamic RAM (DRAM). The image memory 215 temporarily stores image data received via the WLAN unit 201 and those read out from the data storage unit 223 so as to be processed by the CPU 212. The nonvolatile memory 222 is implemented by a memory such as a flash memory, and holds stored data even after the information processing apparatus 200 is powered off.

Note that the memory arrangement of the information processing apparatus 200 is not limited to the above-described one. For example, the image memory 215 and the RAM 214 may share a memory. Data in the image memory 215 and the RAM 214 may be backed up using the data storage unit 223. In this embodiment, an example of the image memory 215 is a DRAM. However, another storage medium such as a Hard Disk Drive (HDD) or a nonvolatile memory may be used.

The data conversion unit 216 can execute analysis of data of various formats in addition to data conversion such as color conversion and image conversion. The telephone unit 217 controls a telephone line, and can implement telephone communication by processing audio data input/output via the loudspeaker unit 224. The GPS 219 acquires position information such as the current latitude and longitude of the information processing apparatus 200 by receiving a radio wave sent from a satellite. The camera unit 221 has a function of electronically recording and encoding an image input via a lens. Image data obtained by image capturing of the camera unit 221 is saved in the data storage unit 223. The loudspeaker unit 224 executes control to implement a function of inputting/outputting a speech for a telephone function, an alarm notification function, and the like. The power supply unit 225 includes a battery, and controls power supply to each element in the apparatus. A power supply state includes, for example, a battery dead state in which the remaining battery amount is equal to or less than a reference, a power-off state in which the power key 204 is not pressed, a power-on state (active state) in which the power key 204 is pressed, and a power saving state in which the power consumption of each element is suppressed.

The display unit 202 electronically controls the display contents to execute control for performing a user operation input and display of the operation state and status condition of the MFP 300. The operation unit 203 outputs, in response to acceptance of an operation input from the user, an electrical signal corresponding to the operation input to the CPU 212. As described above with reference to FIG. 5, a touch panel display can be used as the display unit 202 and the operation unit 203.

The information processing apparatus 200 can perform wireless communication using the WLAN unit 201, and performs data communication with another device such as the MFP 300. For example, the information processing apparatus 200 converts data into packets, and transmits the packets to another external device. The information processing apparatus 200 receives packets from another external device via the WLAN unit 201, reconstructs the packets into original data, and outputs the data to the CPU 212.

The arrangement of the main board 211 is not limited to the above-described example. For example, each function of the main board 211 implemented by the CPU 212 may be implemented by a processing circuit such as an Application Specific Integrated Circuit (ASIC), that is, either hardware or software.

[Internal Arrangement of Access Point]

FIG. 7 is a block diagram of the arrangement of the access point 700 having a wireless LAN access point function. The access point 700 includes a main board 710 that performs system control, a wireless LAN unit 716, a wired LAN unit 718, and an operation button 720. The main board 710 includes a CPU 711, a program memory 713, a data memory 714, a wireless LAN communication controller 715, a wired LAN communication controller 717, an operation unit control circuit 719, a terminal access controller 721, and a channel change unit 722. These are connected by an internal bus 712 to be communicable with each other. Note that processing to be explained below as processing executed by the access point 700 is actually implemented when the CPU 711 executes a program stored in the program memory 713, the data memory 714, or the like.

The CPU 711 performs calculation processing based on a control program stored in the program memory 713 and data held in the data memory 714. The CPU 711 can control the wireless LAN unit 716 by the wireless LAN communication controller 715 to perform wireless LAN communication with another communication information processing apparatus. The CPU 711 can control the wired LAN unit 718 by the wired LAN communication controller 717 to perform wired LAN communication with another communication information processing apparatus. Furthermore, the CPU 711 can accept an operation input from the user by the operation button 720 by controlling the operation unit control circuit 719.

The terminal access controller 721 protects the network by authenticating a communication apparatus to be connected to the network. Examples of an authentication method are the Pre Shared Key (PSK) method using a PSK, and the Simultaneous Authentication of Equals (SAE) method using an SAE. As an authentication method when WPA3-Enterprise authentication is executed, there is provided an IEEE802.1X authentication method using an authentication server that operates by an Extensible Authentication Protocol (EAP) as an authentication protocol. Since the EAP is used in the IEEE802.1X authentication method, the IEEE802.1X authentication method is represented as the IEEE802.1X/EAP authentication method. The EAP method using an authentication server complying with IEEE802.1X/

EAP can be used (IEEE802.1X/EAP will sometimes simply be referred to as "802.1X/EAP" hereinafter). Furthermore, the IEEE802.1X/EAP authentication method will also simply be referred to as the EAP method or IEEE802.1X/EAP hereinafter. The channel of authenticated communication can be changed or switched by the channel change unit 722. Note that in this embodiment, an authentication method not using the authentication server is the PSK method or the SAE method, and an authentication method using the authentication server is the EAP method. Furthermore, an authentication method not using the authentication server is also called a Personal method and an authentication method using the authentication server is also called an Enterprise method.

[Internal Arrangement of Authentication Server]

Figure 8:
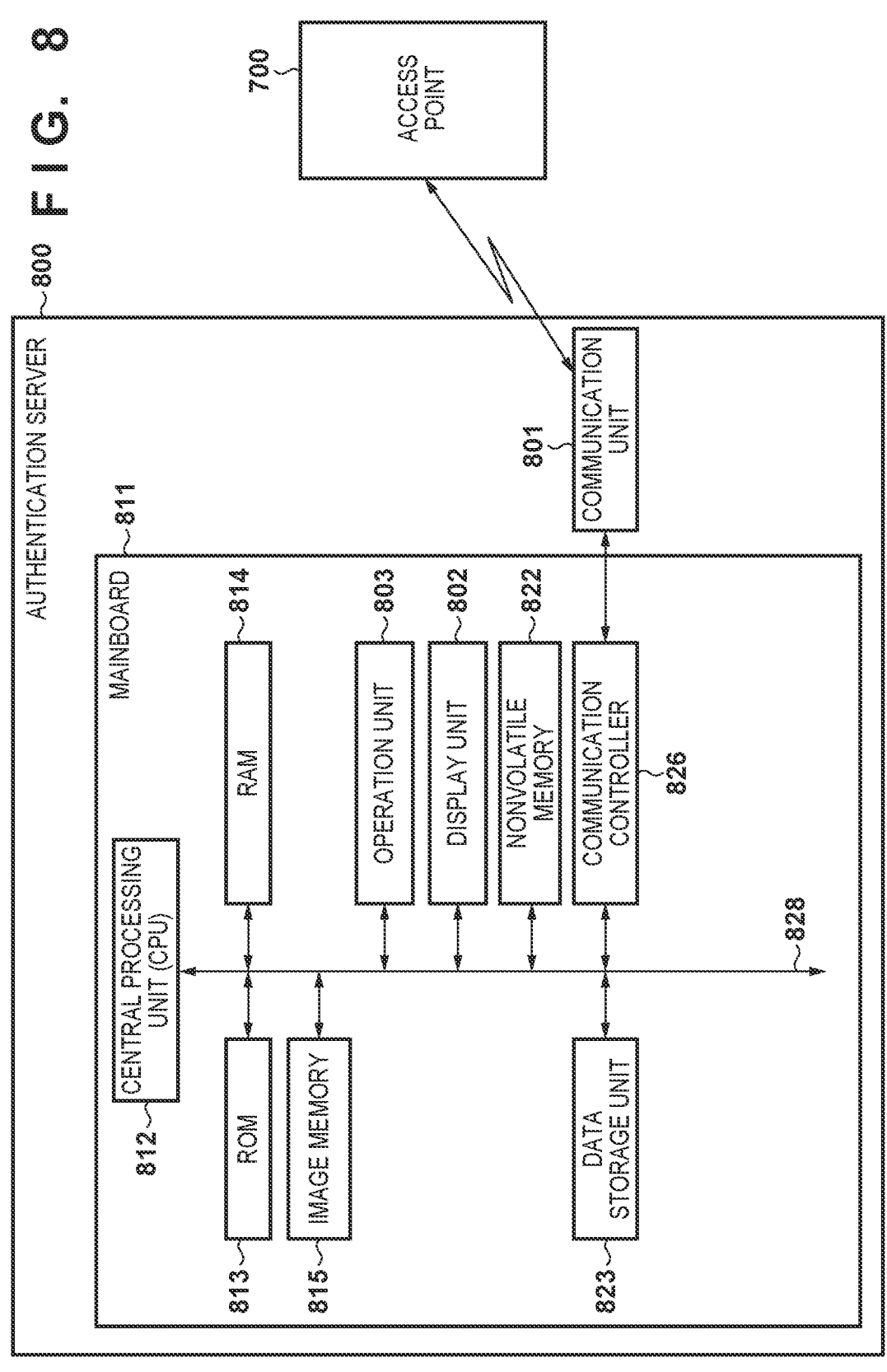
FIG. 8 is a block diagram showing an example of the arrangement of an authentication server.

FIG. 8 is a block diagram of the arrangement of the authentication server 800. The authentication server 800 includes a main board 811 that performs system control, and a communication unit 801 that performs wired LAN communication.

The main board 811 includes a CPU 812, a ROM 813, a RAM 814, an image memory 815, a nonvolatile memory 822, a data storage unit 823, and a communication controller 826. The main board 811 further includes a display unit 802 and an operation unit 803. These are connected to each other via a system bus (bus cable) 828. The main board 811 is connected to the communication unit 801 by the communication controller 826.

The CPU 812 functions as a system controller that controls the overall authentication server 800. The processing of the authentication server 800 is implemented when the CPU 812 loads a program stored in the ROM 813 into the RAM 814 and executes it.

More specifically, the ROM 813 stores a control program to be executed by the CPU 812, an embedded OS program, and the like. The CPU 812 executes a corresponding program under the embedded OS, thereby performing software control such as scheduling or task switching. The RAM 814 is implemented by an SRAM or the like. The RAM 814 stores various data such as program control variables, setting values registered by the user, and management data for managing the authentication server 800. The RAM 814 can be used as various work buffers. The image memory 815 is implemented by a memory such as a DRAM. The image memory 815 temporarily stores image data received via the communication unit 801 and those read out from the data storage unit 823 so as to be processed by the CPU 812. The data storage unit 823 is implemented by a storage medium such as a Solid State Drive (SSD), and holds stored data even after the authentication server 800 is powered off. As another example of the data storage unit 823, another storage medium such as an HDD or nonvolatile memory may be used.

Note that each function of the main board 811 described here may be implemented by either hardware or software, similar to the main board 211 shown in FIG. 6.

The display unit 802 electronically controls the display contents to execute control for performing a user operation input and display of the status condition. The operation unit 803 outputs, in response to acceptance of an operation input from the user, an electrical signal corresponding to the operation input to the CPU 812.

The authentication server 800 can perform data communication with the access point 700 (or another device) via the communication unit 801 by the communication controller 826. For example, the authentication server 800 converts data to be transmitted into packets, and transmits the packets to another external device via the communication unit 801. The communication unit 801 receives packets from another external device, reconstructs the packets into original data, and outputs the data to the CPU 812. The communication unit 801 can perform data (packet) communication in a wired LAN (Ethernet) system complying with, for example, the IEEE802.3 series.

[Peer to Peer (P2P) Mode]

Wireless Direct communication in which communication apparatuses perform wireless communication/connection directly (without intervention of the external access point 700) in WLAN communication will be described. For example, a communication apparatus can support a plurality of modes for Wireless Direct communication, and execute P2P communication (WLAN) by selectively using one of the plurality of modes. Connection to the MFP 300 operating in the P2P mode without intervention of the external access point 700 is called P2P connection. As P2P modes, the following two modes are assumed.

mode A (Software AP mode)

mode B (Wi-Fi Direct (WFD) mode)

A communication apparatus capable of executing P2P communication can be configured to support at least one of these modes (in this specification, mode A and mode B can collectively be represented as a Wireless Direct mode). A communication apparatus capable of executing P2P communication need not support all the modes, and may be configured to support some of the modes. Note that the MFP 300 operating in the P2P mode operates as a master in connection/communication to/with another apparatus. That is, in the software AP mode, the MFP 300 operates as a software access point (AP). Then, in the WFD mode, the MFP 300 operates as a group owner. Note that the WFD mode is not limited to this, and the MFP 300 may operate as a station by executing group owner negotiation. Note that the communication apparatus can support the wireless infrastructure mode (mode C) in addition to the P2P modes. FIG. 10C shows a state in which the MFP 300 operates in the P2P mode. In this state, communication between the MFP 300 and the information processing apparatus 200 can be implemented without intervention of the authentication server 800 or the access point 700.

In a communication apparatus (for example, the information processing apparatus 200) having the WFD communication function, if a user operation is accepted via an operation unit, an application (or a dedicated application) for implementing the communication function is called. This communication apparatus can display a User Interface (UI) screen provided by the application to prompt the user to input an operation, and execute WFD communication based on the input operation.

[Wireless Infrastructure Mode]

In the wireless infrastructure mode, communication apparatuses (for example, the information processing apparatus 200 and the MFP 300) which communicate with each other are connected to an external access point (in this example, the AP 700) that controls a network and communication between the communication apparatuses is performed via the AP. In other words, communication between the communication apparatuses is implemented via the network created by the AP. The MFP 300 operating in the wireless infrastructure mode operates as a station in connection/communication to/with the access point 700. Connection, via the external access point 700, to the MFP 300 operating in the wireless infrastructure mode is called infrastructure connection.

In the wireless infrastructure mode, each apparatus searches for an access point by transmitting an apparatus search request (Probe Request). If each apparatus receives an apparatus search response (Probe Response) from the access point, it displays a Service Set Identifier (SSID) included in the apparatus search response. Each of the information processing apparatus 200 and the MFP 300 finds the access point 700, transmits a connection request to the access point 700, and is connected to the access point 700, thereby enabling communication between these communication apparatuses in the wireless infrastructure mode via the access point 700.

Note that a plurality of communication apparatuses may be connected to different APs. In this case, when data transfer is performed between the APs, communication between the communication apparatuses is possible. As commands and parameters transmitted/received at the time of communication between the communication apparatuses, commands and parameters complying with the Wi-Fi standard are used.

The access point 700 decides the frequency band and the frequency channel. For example, the access point 700 can select one of the 5- and 2.4-GHz frequency bands to be used and select the frequency channel to be used in the frequency band.

When the information processing apparatus 200 or the MFP 300 is connected to the wireless LAN formed by the access point 700, the access point 700 performs authentication. The information processing apparatus 200 or the MFP 300 is connected to the wireless LAN formed by the access point 700 using a wireless LAN authentication method such as the PSK method, SAE method, or EAP method in accordance with the authentication method of the wireless LAN formed by the access point 700.

Figure 10A:
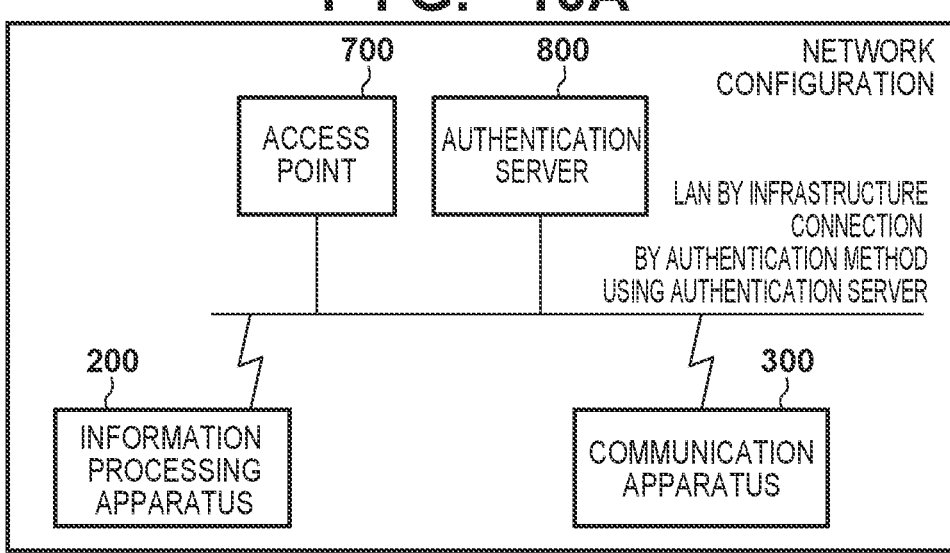
FIGS. 10A to 10C are views each showing an example of a network configuration.

Note that FIG. 10A shows a state in which the MFP 300 operates in the wireless infrastructure mode in which the MFP 300 is connected to the access point 700 complying with IEEE802.1X/EAP. In this state, communication between the MFP 300 and the information processing apparatus 200 can be implemented based on authentication performed in cooperation between the authentication server 800 and the access point 700.

Figure 10B:
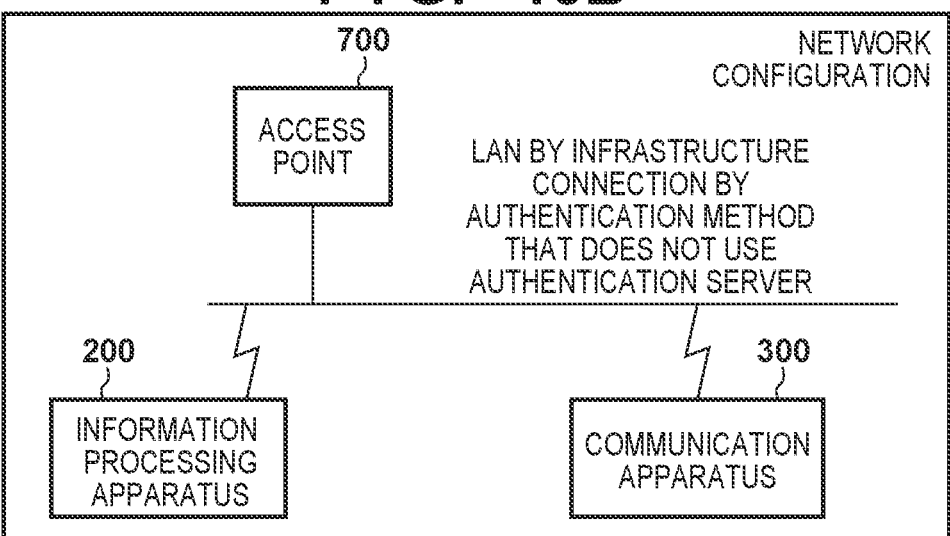
Figure 10C:
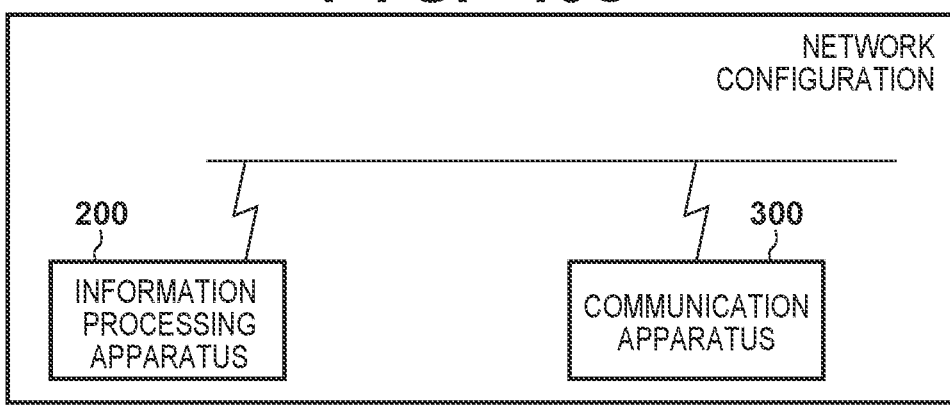

Furthermore, FIG. 10B shows a state in which the MFP 300 operates in the wireless infrastructure mode in which the MFP 300 is connected to the access point 700 not complying with IEEE802.1X/EAP. In this state, communication between the MFP 300 and the information processing apparatus 200 can be implemented without performing authentication in cooperation between the authentication server 800 and the access point 700.

[Wired Communication Mode]

In the wired communication mode, a communication apparatus (for example, the MFP 300) can communicate with another communication apparatus via a wired interface such as a wired LAN. For example, when the MFP 300 executes communication in the wired communication mode, communication in the wireless infrastructure mode is restricted. In the wired communication mode, for example, data (packet) communication in the wired LAN (Ethernet) complying with the IEEE802.3 series is possible. When operating in a state in which the IEEE802. MEAP setting is enabled, the MFP 300 executes IEEE802.1X authentication to be connected to the wired LAN formed by the access point 700.

[Wireless Simultaneous Operation]

When communication in each of the two modes is communication by the authentication method not using the authentication server 800, the MFP 300 can execute communications in the respective modes simultaneously (in parallel). That is, connections for executing communications in the respective modes are maintained simultaneously. More specifically, for example, communication in the wireless infrastructure mode and communication in the P2P mode can be executed simultaneously. Therefore, the MFP 300 maintains both connection for communication in the wireless infrastructure mode and connection for communication in the P2P mode simultaneously. This operation may be expressed as a "wireless simultaneous operation". In other words, the wireless simultaneous operation can be regarded as, for example, an operation in which the MFP 300 simultaneously executes an operation as a station in Wi-Fi communication in the wireless infrastructure mode and an operation as a master in Wi-Fi communication in the P2P mode. On the other hand, if the MFP 300 performs communication by the authentication method using the authentication server 800, it does not maintain infrastructure connection and P2P connection simultaneously. Connection by Wi-Fi communication in one of the modes is maintained at a time. If the communication mode is changed, the maintained connection is released and connection in the new communication mode is established.

[Overview of Processing]

Processing associated with communication according to this embodiment will be described below with reference to FIGS. 9 to 16. Each step of flowcharts shown in FIGS. 9, 13, and 15 will be described to be executed by an apparatus but correctly, each step is performed when the CPU of the apparatus that executes each flowchart deploys a program stored in the ROM into the RAM and executes it.

[Screen Flow]

FIGS. 11A to 11J are views showing a screen flow in a case in which a LAN setting is selected from the setting menu of the screen 408 shown in FIG. 4B on the operation display unit 302 of the MFP 300.

FIG. 11A shows a screen which is displayed when the user selects a selection item "LAN setting" in the screen 408 shown in FIG. 4B and in which the LAN setting can be changed. In the screen shown in FIG. 11A, "wireless LAN" 1201, "wired LAN" 1202, "P2P mode" (Wireless Direct) 1203, and "common setting" 1204 are displayed as selection items selectable by the user. If the access point supporting the Personal method is connected to the MFP 300, the user selects the "wireless LAN" 1201.

FIG. 11B shows a screen which is displayed when the user selects the "wireless LAN" 1201 in the screen shown in FIG. 11A and in which the wireless LAN setting can be changed. In the screen shown in FIG. 11B, "wireless LAN enable/disable" 1211, "wireless LAN setup" 1212, "wireless LAN setting display" 1213, and "advanced setting" 1214 are displayed as selection items selectable by the user.

The "wireless LAN enable/disable" 1211 is a region for enabling or disabling the MFP 300 to perform communication using the wireless LAN. When a user operation is accepted in a display screen after the region is selected, the state in which the MFP 300 can perform communication using the wireless LAN is disabled or enabled. Note that in a state in which that state is disabled, the MFP 300 executes no communication or connection using the wireless LAN.

FIG. 11C shows a screen which is displayed when the user selects the "advanced setting" 1214 in the screen shown in FIG. 11B and in which the LAN advanced setting can be changed. In the screen shown in FIG. 11C, "TCP/IP setting" 1221 and "802.1X/EAP setting" 1222 are displayed as selection items selectable by the user.

FIG. 11D shows a screen which is displayed when the user selects the "802.1X/EAP setting" 1222 in the screen shown in FIG. 11C and in which the IEEE802.1X/EAP setting can be changed. In the screen shown in FIG. 11D, "IEEE802.1X/EAP enable/disable" 1231, "EAP router search" 1232, and "confirmation of latest authentication result" 1233 are displayed as selection items selectable by the user. Note that an EAP router as a search target is a wireless LAN router having a wireless access point function supporting the EAP. "EAP router" is merely an example of display, and the EAP router as a search target may be a wireless access point functioning as an authenticator in IEEE802.1X.

FIG. 11E shows a screen which is displayed while a search for a wireless access point of the authentication method using the authentication server 800 is executed. The access point search can be executed in response to selection of the "EAP router search" 1232 in the screen shown in FIG. 11D while the "IEEE802.1X/EAP setting" is enabled. A screen 1240 is displayed while the search is executed.

Note that the screen shown in FIG. 11E is also displayed while the user selects the "wireless LAN setup" 1212 in the screen shown in FIG. 11B and a search for a wireless access point of the authentication method not using the authentication server 800 is executed.

A screen shown in FIG. 11F is an example of a screen for displaying a list of the identifiers (SSIDs) of wireless access points as a result of the EAP wireless LAN router search, that is, the access point search (AP search). FIG. 11F shows an example in which "SSIDWPA-EAP001" 1251, "WPA2-EAP005" 1252, and "WPA3-EAP003" 1253 are displayed as selection items (found SSIDs). Note that these support the WPA-EAP method, WPA2-EAP method, and WPA3-EAP method, respectively.

Note that as other display examples, known methods such as the WPA-PSK method, WPA2-PSK method, and WPA3-SAE method may be displayed, or the OPEN method may additionally be displayed. If the "EAP router search" 1232 is selected in the screen shown in FIG. 11D, only the SSIDs of access points whose authentication method is the EAP method are displayed in the screen shown in FIG. 11F. If the "wireless LAN setup" 1212 is executed, only the SSIDs of access points whose authentication method is not the EAP method are displayed.

A screen shown in FIG. 11G is a screen which is displayed while the user selects one of the SSIDs (1251 to 1253) of the access points in the screen shown in FIG. 11F and the MFP 300 executes connection processing to the selected access point. As another form, another display may be executed to represent that the connection processing is in progress.

A screen shown in FIG. 11H is a screen which is displayed when, after the screen shown in FIG. 11G is displayed, the attempt to execute connection to the access point is complete, and the connection succeeds or the connection proceeds to a predetermined stage.

A screen shown in FIG. 11I is a screen which is displayed when the user selects the "802.1X/EAP enable/disable" 1231 in the screen shown in FIG. 11D and in which enable/disable of the IEEE802.1X/EAP setting can be changed. In the screen shown in FIG. 11I, "enable" 1281 and "disable" 1282 are displayed as selection items. A state in which the IEEE802.1X/EAP authentication method is enabled in the MFP 300 is a state in which authentication using the IEEE802.1X/EAP authentication method and authentication using the Personal method are possible. In other words, this state is a state in which connection to the access point supporting the IEEE802.1X/EAP authentication method is possible and connection to the access point supporting the Personal method is possible. Furthermore, a state in which IEEE802.1X/EAP is disabled in the MFP 300 is a state in which authentication using the IEEE802.1X/EAP authentication method is impossible and authentication using the Personal method is possible. In other words, this state is a state in which connection to the access point supporting the IEEE802.1X/EAP authentication method is impossible and connection to the access point supporting the Personal method is possible.

A screen shown in FIG. 11J is a screen which is displayed when the "EAP router search" 1232 is selected while the "IEEE802.1X/EAP enable/disable" 1231 is disabled in the screen shown in FIG. 11D. That is, in this embodiment, if the IEEE802.1X/EAP setting is disabled, even if the "EAP router search" 1232 is selected, no router search is executed. Therefore, a message for calling attention is displayed, as shown in FIG. 11J.

Note that control not to execute connection to the access point by the IEEE802.1X/EAP authentication, which is executed when the IEEE802.1X/EAP setting is disabled, is not limited to the above-described control. For example, the MFP 300 may execute a router search but need not display, in a list of access points found by the router search, an access point in which IEEE802.1X/EAP authentication is enabled. Alternatively, an access point in which IEEE802.1X/EAP authentication is enabled may also be displayed in the list but even if the user selects the access point, the MFP 300 need not execute connection processing to the access point in which IEEE802.1X/EAP authentication is enabled.

[Setting of Information for IEEE802.1X/EAP Authentication]

If the MFP 300 executes connection processing of performing connection to the network in which IEEE802.1X/EAP authentication is enabled, the connection processing needs to be started after setting for the connection processing is made in the MFP 300. In this embodiment, this setting is executed when the information processing apparatus 200 transmits information for executing the setting to the MFP 300 and the MFP 300 receives the information.

Figure 9:
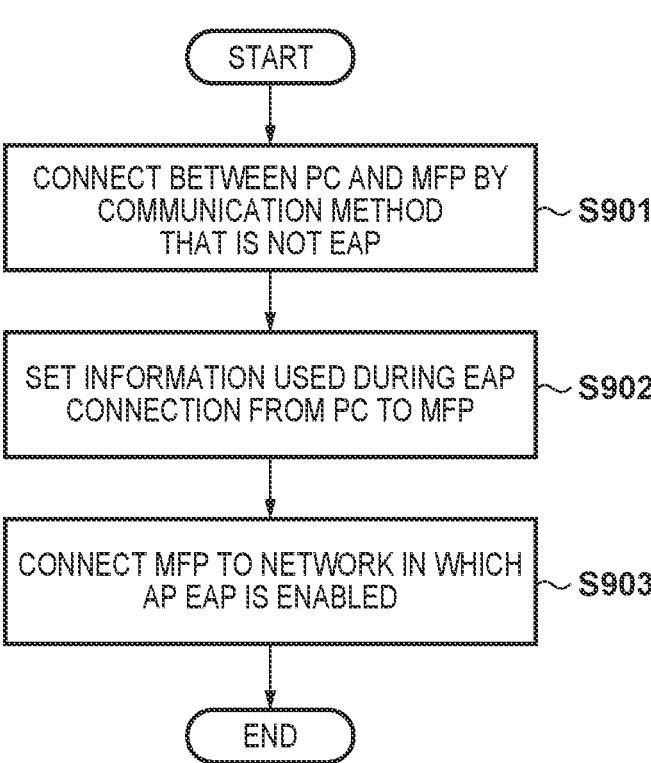
FIG. 9 is a flowchart illustrating an example of a procedure of connecting the MFP to a network operating by an authentication method using the authentication server.

FIG. 9 is a flowchart executed by the MFP 300 (more correctly, the CPU 311) for connection processing of performing connection to the network in which IEEE802.1X/EAP authentication is enabled.

In step S901, the MFP 300 establishes connection between the information processing apparatus 200 and the MFP 300. More specifically, for example, the MFP 300 accepts a connection request from the information processing apparatus 200 and establishes connection between the information processing apparatus 200 and the MFP 300 operating in the P2P mode. Note that the form of the established connection is not limited to wireless P2P connection, and for example, wired LAN connection or USB connection may be possible. Furthermore, for example, infrastructure connection via the access point supporting the Personal method may be possible.

In step S902, the MFP 300 transmits, to the information processing apparatus 200, information for displaying a setting screen for executing setting of the MFP 300 concerning IEEE802.1X/EAP authentication (to be described later). Then, the information processing apparatus 200 displays the setting screen (screens shown in FIGS. 12A to 12K) using the information, and accepts an input concerning the setting from the user. After that, the information processing apparatus 200 transmits authentication information based on the accepted input to the MFP 300. The MFP 300 receives, from the information processing apparatus 200, the authentication information with respect to the MFP 300, and executes setting concerning IEEE802.1X/EAP authentication using the information. This setting can be done when the information processing apparatus 200 transmits the authentication information to the MFP 300 via the connection established in step S901, and the MFP 300 receives the authentication information.

In step S903, the MFP 300 is connected to the network based on the setting executed in step S902. In other words, the MFP 300 establishes, based on the setting executed in step S902, connection to the access point in which IEEE802.1X/EAP authentication is enabled. Note that at this time, connection between the MFP 300 and the access point may fail depending on contents of the setting executed in step S902.

FIGS. 12A to 12K show various display examples concerning the setting screen of the MFP 300 displayed on the display unit 202 of the information processing apparatus 200. Each of these screens is displayed on the display unit 202 when a Web browser or application operating on the information processing apparatus 200 communicates with an HTTP server operating on the MFP 300. More specifically, for example, when the IP address of the MFP 300 is input to the Web browser operating on the information processing apparatus 200, the information processing apparatus 200 accesses the MFP 300. Then, in response to the access, the MFP 300 provides, to the information processing apparatus 200, screen information for displaying each of the screens shown in FIGS. 12A to 12K. Then, the information processing apparatus 200 displays each of the screens shown in FIGS. 12A to 12K based on the screen information provided by the MFP 300. That is, each of the screens shown in FIGS. 12A to 12K shows an example of a remote user interface (remote UI) concerning the setting, which is displayed on the information processing apparatus 200 based on the screen information provided by the MFP 300. This screen may be displayed based on a standby response of an HTTP request in USB communication using the USB communication controller 320 of the MFP 300.

FIG. 12A shows a top menu screen of the setting screen of the MFP 300 displayed on the information processing apparatus 200. This screen includes "printer state" 1101, "main body setting" 1102, "LAN setting" 1103, and "security setting" 1104 as selection items.

FIG. 12B shows a screen displayed when the "security setting" 1104 is selected in FIG. 12A. This screen includes "SSL/TLS setting" 1111 and "(IEEE)802.1X/EAP setting" 1112 as selection items.

FIG. 12C shows a screen displayed when the "802.1X/EAP setting" 1112 is selected in FIG. 12B. This screen includes "authentication method" 1121, "key and certificate setting" 1122, and "(IEEE)802.1X/EAP enable/disable" 1123 as selection items.

FIG. 12D shows a screen displayed when the "authentication method" 1121 is selected in FIG. 12C. This screen includes "EAP-TLS" 1131, "EAP-TTLS" 1132, and "PEAP" 1133 as selection items of the authentication method. In addition, this screen includes an entry field 1134 of "user name (login name)", and an entry field 1135 of a password. If the user selects one of the selection items 1131 to 1133, the authentication method to be used at the time of IEEE802.1X/EAP authentication is set in the MFP 300 from the information processing apparatus 200. If the user name is input to the entry field 1134 and the password is input to the entry field 1135, the user name and the password to be used at the time of IEEE802.1X/EAP authentication are set in the MFP 300 from the information processing apparatus 200.

If a certificate to be used at the time of IEEE802.1X/EAP authentication is registered in the MFP 300, the user first selects the "key and certificate setting" 1122 in the screen shown in FIG. 12C. If, as a result, for example, EAP-TLS is selected, the screen shown in FIG. 12E is displayed. After that, if the user selects "key and certificate upload" 1141 as one of the selection items in the screen shown in FIG. 12E, a screen shown in FIG. 12F is displayed. In this screen, the user selects a file as a certificate in a field 1161, inputs a password as a key in a field 1162, and then selects an upload button 1163, thereby completing the uploading (transmission) of the key and certificate to the MFP 300. The key and certificate designated to be uploaded are set in the MFP 300, and the input user name and password are also set in the MFP 300. The MFP 300 acquires the location of a certificate file, a file name, key information, the user name, and password from the information processing apparatus 200, and executes setting concerning IEEE802.1X/EAP authentication using the acquired information.

Note that the screen shown in FIG. 12E includes "deletion of key and certificate" 1142 and "confirmation of key and certificate" 1143 as selection items. If the user selects the "deletion of key and certificate" 1142, it is possible to delete a certificate saved in the MFP 300. If the user selects the "confirmation of key and certificate" 1143, it is possible to display a list of certificates saved in the MFP 300.

FIG. 12G shows a screen displayed when the user selects the "IEEE802.1X/EAP enable/disable" 1123 in the screen shown in FIG. 12C. In this screen, enabling/disabling of the IEEE802.1X/EAP setting of the MFP 300 can be selected (in the example of FIG. 12G, disabling is selected). Then, if an OK button is selected, the selection is reflected. Note that enabling of the IEEE802.1X/EAP setting is to set the MFP 300 in a state in which IEEE802.1X/EAP is enabled. Disabling of the IEEE802.1X/EAP setting is to set the MFP 300 in a state in which IEEE802.1X/EAP is disabled.

FIG. 12H shows a screen displayed when the user selects the "LAN setting" in the screen shown in FIG. 12A. In this screen, the same selection items as those in FIG. 11A displayed on the operation display unit 302 of the MFP 300 are displayed.

FIG. 12I shows a screen displayed when the user selects the "wireless LAN" in FIG. 12H. This screen has the same meaning as that in FIG. 11B displayed on the operation display unit 302 of the MFP 300.

FIG. 12J shows a screen displayed when the user selects the "advanced setting" in the screen shown in FIG. 12I. This screen has the same meaning as that in FIG. 11C displayed on the operation display unit 302 of the MFP 300.

FIG. 12K shows a screen displayed when the user selects the "IEEE802.1X/EAP setting" in the screen shown in FIG. 12J. This screen has the same meaning as that in FIG. 11D displayed on the operation display unit 302 of the MFP 300.

If a user operation is performed on each of the screens shown in FIGS. 12A to 12K, authentication information based on contents of the user operation is transmitted to the MFP 300. Then, the MFP 300 receives the authentication information, and setting concerning the EAP is executed on the MFP 300 based on the information. That is, the authentication information includes information corresponding to each IEEE802.1X authentication method among the authentication method to be used at the time of IEEE802.1X/EAP authentication, the user name and password to be used at the time of authentication, and the key and certificate to be used at the time of authentication. If the MFP 300 is authenticated by the authentication server 800 using the authentication information, it can be connected to the network formed by the access point 700 and using the authentication server 800. In this case, since the MFP 300 cannot simultaneously enable P2P connection and infrastructure connection using IEEE802.1X/EAP authentication, P2P connection is disconnected at the start of an EAP router search.

Note that in this embodiment, the enabled state (ON state)/disabled state (OFF state) of each communication mode is managed. For example, in the MFP 300, it is possible to switch the enabled communication mode and control communication by controlling the wireless communication unit 307 and the wired LAN communication unit 321.

[AP Search of EAP Method and Storage of Authentication Result]

FIG. 13A is a flowchart illustrating an operation in a case in which the MFP 300 executes connection to the access point 700 supporting the authentication method using the authentication server 800. That is, FIG. 13A is a flowchart illustrating details of step S903.

The flowchart shown in FIG. 13A is executed when the "EAP router search" (FIG. 11D) displayed on the operation display unit 302 of the MFP 300 is operated or when the "EAP router search" (FIG. 12K) displayed on the information processing apparatus 200 is operated.

In step S1301, the MFP 300 accepts a search request (AP search request) of the access point 700 issued by operating the "EAP router search". Note that if FIG. 11D is operated, the MFP 300 issues an AP search request, and accepts the AP search request. If FIG. 12K is operated, the information processing apparatus 200 issues an AP search request, and the MFP 300 accepts the AP search request.

In step S1302, the MFP 300 executes a search for the access point 700 complying with IEEE802.1X/EAP.

In step S1303, the MFP 300 determines whether the accepted AP search request is issued by the information processing apparatus 200. In other words, it is determined whether the request source of the AP search is the external apparatus of the information processing apparatus 200. If YES is determined, the process advances to step S1304. If NO is determined, the process advances to step S1305.

In step S1304, the MFP 300 transmits, to the information processing apparatus 200 as the AP search request source, a list of the SSIDs of the access points 700 found as a result of the AP search in step S1303.

In step S1305, the MFP 300 displays, on the operation display unit 302, the list of the SSIDs of the access points 700 found as a result of the AP search in step S1303. Then, the MFP 300 is connected to the access point corresponding to the SSID selected from the list by the user. After that, the MFP 300 requests, based on the setting executed in step S902, the authentication server corresponding to the access point to perform IEEE802.1X/EAP authentication, thereby attempting the authentication. After that, the MFP 300 may display an IEEE802.1X/EAP authentication result on the operation display unit 302. If the IEEE802.1X/EAP authentication result indicates a failure, a failure reason may also be displayed.

FIG. 13B shows processing executed after step S1304.

In step S1306, the MFP 300 receives, from the information processing apparatus 200, a connection request to the AP including the SSID of the AP (connection target AP) selected as a connection target by the user.

In step S1307, the MFP 300 stores the communication mode of the MFP 300 at the time of receiving the connection request. In this example, assume that the P2P mode is stored as the communication mode of the MFP 300 at the time of receiving the connection request.

In step S1308, the MFP 300 acquires the identification information (identifier) of the information processing apparatus 200 from the information processing apparatus 200.

If the MFP 300 operates in a communication mode incompatible with IEEE802.1X/EAP connection, it stops the communication mode and disconnects the connection from the information processing apparatus 200 in step S1309. This is done to attempt IEEE802.1X/EAP connection later. Note that in this embodiment, the communication mode incompatible with IEEE802.1X/EAP connection is assumed to be the P2P mode or the wireless infrastructure mode used for connection to the access point supporting authentication by the Personal method. Note that the present invention is not limited to this, and another mode may the communication mode incompatible with IEEE802.1X/EAP connection. A communication mode compatible with IEEE802.1X/EAP connection is assumed to be the wired LAN mode or the USB communication mode. Note that the present invention is not limited to this, and another mode may be the communication mode compatible with IEEE802.1X/EAP connection. Note that IEEE802.1X/EAP connection indicates connection to the AP complying with IEEE802.1X/EAP. Then, the MFP 300 executes connection to the connection target AP as the AP corresponding to the connection request received in step S1306.

In step S1310, the MFP 300 requests, based on the setting executed in step S902, the authentication server corresponding to the connection target AP to perform IEEE802.1X/EAP authentication, thereby attempting the authentication.

In step S1311, the MFP 300 stores an IEEE802.1X/EAP authentication result in the data memory 314. The authentication result includes the success or failure of the authentication, and a detected failure reason.

In step S1312, the MFP 300 determines whether the communication mode stored in step S1307 is a communication mode incompatible with IEEE802.1X/EAP connection. If YES is determined, the process advances to step S1313. If NO is determined, the process advances to step S1315.

In step S1313, the MFP 300 disconnects the IEEE802.1X/EAP connection.

In step S1314, the MFP 300 enables the communication mode stored in step S1307, and restarts the operation in the communication mode. Then, the MFP 300 reestablishes connection to the information processing apparatus 200.

In step S1315, the MFP 300 receives the identification information of the information processing apparatus 200 from the information processing apparatus 200, and determines whether the received identification information matches the identification information stored in step S1308. If YES is determined, the process advances to step S1316. If NO is determined, this processing ends. Note that if NO is determined in step S1315, the connection may be disconnected from the information processing apparatus 200.

In step S1316, the MFP 300 transmits the IEEE802.1X/EAP authentication result stored in step S1311 to the information processing apparatus 200. If the information processing apparatus 200 receives the IEEE802.1X/EAP authentication result, it displays the IEEE802.1X/EAP authentication result. At this time, if the IEEE802.1X/EAP authentication result indicates a failure, a failure reason may also be displayed.

In step S1317, the MFP 300 determines whether the IEEE802.1X/EAP authentication succeeds or not. If it is determined that the authentication fails, the MFP 300 ends the processing of this flowchart. Note that at this time, the IEEE802.1X/EAP authentication result and the failure reason may be displayed on the operation display unit 302. If it is determined that the authentication succeeds, the MFP 300 advances the process to step S1318. If it is determined that the authentication succeeds, the IEEE802.1X/EAP authentication result indicating the success may be displayed on the operation display unit 302.

In step S1318, the MFP 300 re-executes connection to the connection target AP as the AP corresponding to the connection request received in step S1306. Note that if IEEE802.1X/EAP authentication is required again, the MFP 300 requests, based on the setting executed in step S902, the authentication server corresponding to the connection target AP to perform IEEE802.1X/EAP authentication, thereby attempting the authentication. After that, the processing ends.

[Wireless Infrastructure (EAP) Setup from Information Processing Apparatus 200]

Wireless infrastructure (EAP) setup by an operation from the information processing apparatus 200 will be described below.

FIGS. 14A to 14E show a screen flow in the information processing apparatus 200 when the MFP 300 executes connection to the access point 700 supporting the authentication method using the authentication server 800.

FIG. 15 is a flowchart illustrating processing in the information processing apparatus 200 at this time. The processing of the flowchart shown in FIG. 15 is started in response to selection of the "EAP router search" by the user in the screen shown in FIG. 12K.

In step S1501, the information processing apparatus 200 transmits an Access Point (AP) search request to the MFP 300. In step S1502, the information processing apparatus 200 displays the screen shown in FIG. 14A on the display unit 202, and notifies the user that the MFP 300 currently executes an AP search. Note that at this time, the MFP 300 is in the processing state of step S1303 of FIG. 13.

If the AP search ends, the MFP 300 transmits a list of the SSIDs of the APs to the information processing apparatus 200. Therefore, in step S1503, the information processing apparatus 200 receives the list of the SSIDs of the APs as a search result from the MFP 300.

In step S1504, the information processing apparatus 200 displays the list of the SSIDs of the connection target APs on the screen 202, as shown in FIG. 14B, and waits for selection from the user. If the user performs an operation of selecting the connection target AP, the information processing apparatus 200 transmits, in step S1505, a connection request added with the SSID of the selected AP to the MFP 300.

Upon receiving the connection request, the MFP 300 executes IEEE802.1X/EAP connection to the connection target AP and an attempt to authenticate with the authentication server. The information processing apparatus 200 waits for an authentication result from the MFP 300, and thus displays, in step S1506, the screen shown in FIG. 14C on the display unit 202.

In step S1507, the information processing apparatus 200 receives the authentication result from the MFP 300. Then, in step S1508, the information processing apparatus 200 determines whether the authentication result indicates a success or a failure. If it is determined that the authentication fails, the information processing apparatus 200 advances the process to step S1517, and displays the authentication result indicating the failure and a failure reason on the display unit 202. FIG. 14E shows a display example at this time. The information processing apparatus 200 displays the original menu screen in step S1516, and ends this processing.

On the other hand, if it is determined in step S1508 that the authentication succeeds, the information processing apparatus 200 advances the process to step S1509. In step S1509, the information processing apparatus 200 displays, on the display unit 202, a screen of FIG. 14D indicating that the authentication result indicates a success. This screen of FIG. 14D includes a message 1443 for inquiring the user whether to shift to IEEE802.1X/EAP connection, and a "YES" button 1441 and a "NO" button 1442 for making a selection.

In step S1510, the information processing apparatus 200 waits until the "YES" button 1441 or the "NO" button 1442 in the screen shown in FIG. 14D is pressed. If one of the buttons is pressed, the information processing apparatus 200 advances the process to step S1551, and determines which of the buttons is pressed. That is, in step S1551, the information processing apparatus 200 determines whether the user requests to shift to IEEE802.1X/EAP connection or to stop the shift.

If the user requests to shift to IEEE802.1X/EAP connection (that is, the user presses the "YES" button 1441) in the screen shown in FIG. 14D, the information processing apparatus 200 advances the process to step S1512, and transmits an IEEE802.1X/EAP connection request to the MFP 300. Note that since this connection request means the permanent use of IEEE802.1X/EAP connection, if the MFP 300 receives the connection request, the P2P connection is automatically disabled. Therefore, these setting screens by the Web browser or application in the information processing apparatus 200 cannot be used until the user intentionally disables the IEEE802.1X/EAP connection and enables the P2P connection. Thus, in the screen shown in FIG. 14D, a message is displayed to represent that if the "YES" button 1441 is pressed, communication with the MFP 300 is disconnected and thus the application automatically ends. In step S1513, if the time elapses, the information processing apparatus 200 closes the screen or application.

If the user requests to stop the shift to IEEE802.1X/EAP connection (that is, the user presses the "NO" button 1442) in the screen shown in FIG. 14D, the information processing apparatus 200 advances the process to step S1515. In step S1515, the information processing apparatus 200 transmits an IEEE802.1X/EAP connection stop request to the MFP 300.

Furthermore, the information processing apparatus 200 displays the screen shown in FIG. 14D, and measures an elapsed time of a state in which the user leaves the screen without pressing the "YES" button 1441 or the "NO" button 1442 (step S1514). If the time elapses, the information processing apparatus 200 considers that there is no request of IEEE802.1X/EAP connection from the user, and advances the process from step S1514 to step S1515 to transmit an IEEE802.1X/EAP connection stop request to the MFP 300. Therefore, in the message 1443, information indicating that IEEE802.1X/EAP connection is stopped automatically after 10 sec is displayed. After that, the information processing apparatus 200 advances the process to step S1516, and displays the menu screen (FIG. 12K) before the AP search, thereby ending the processing of this flowchart.

[Examples of Authentication Result]

FIG. 16 shows an example of a corresponding table indicating an authentication result and a display message according to the embodiment. In step S1310 of FIG. 13B, states in a case in which the MFP 300 transmits an authentication request to the authentication server to execute authentication processing are listed in a state column. An ID column indicates an identifier for uniquely specifying each state. A message column indicates a display message to be notified to the user in each state.

As described above, according to this embodiment, the user of the information processing apparatus 200 can execute, by only a remote operation from the information processing apparatus 200, setting and operations until the MFP 300 performs IEEE802.1X/EAP connection.

Other Embodiments

The form in which if an AP search request is received from the information processing apparatus 200, an authentication result is transmitted to the information processing apparatus 200, and if an AP search request is accepted by an operation on the operation display unit 302, no authentication result is transmitted to the information processing apparatus 200 has been described above. However, the present invention is not limited to this, and even if an AP search request is accepted by an operation on the operation display unit 302, an authentication result may be transmitted to the information processing apparatus 200 at a timing of establishment of connection between the MFP 300 and the information processing apparatus 200.

The name of each of the elements and functional units described in the above embodiment is expressed based on the main function in this specification but may be expressed based on the sub-function. Therefore, the present invention is not strictly limited to this (this expression can be replaced by a similar expression).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-068467, filed Apr. 18, 2022, which is hereby incorporated by reference herein in its entirety.

What is claimed is:

1. A communication apparatus communicable with an information processing apparatus, the communication apparatus comprising:

at least one memory storing instructions; and at least one processor that, upon executing the stored instructions, causes the communication apparatus to:

transmit, to the information processing apparatus, information for displaying a setting screen for accepting an input of setting information concerning Extensible Authentication Protocol (EAP) authentication as authentication based on IEEE802.1X/EAP;

receive, from the information processing apparatus, the setting information input to the setting screen;

accept a request to execute the EAP authentication;

attempt, in a case where the request is accepted, EAP authentication with a predetermined authentication server based on the setting information input to the setting screen; and transmit, based on a failure of the EAP authentication, information for displaying a screen based on the failure of the EAP authentication to the information processing apparatus, wherein, in a case where the request is accepted in a state in which the communication apparatus operating in a first communication mode is connected to another apparatus, the EAP authentication is attempted after connection based on the first communication mode is disconnected, and wherein, in a case where the request is accepted in a state in which the communication apparatus operating in a second communication mode is connected to the other apparatus, the EAP authentication is attempted without disconnecting connection based on the second communication mode.

2. The apparatus according to claim 1, wherein the screen based on the failure of the EAP authentication includes a region for indicating the failure of the EAP authentication to a user.

3. The apparatus according to claim 1, wherein the screen based on the failure of the EAP authentication includes a region for indicating a reason for the failure of the EAP authentication to a user.

4. The apparatus according to claim 3, wherein the reason for the failure of the EAP authentication includes at least one of a reason that a client certificate is unauthorized, a reason that a certificate of the authentication server expires, and a reason that a client authentication error occurs.

5. The apparatus according to claim 1, wherein after the communication apparatus is connected to an access point complying with IEEE802.1X/EAP, the EAP authentication is attempted.

6. The apparatus according to claim 1, wherein the at least one processor further causes the communication apparatus to reestablish, after the connection based on the first communication mode is disconnected and then the EAP authentication is attempted, connection based on the first communication mode.

7. The apparatus according to claim 6, wherein the information for displaying the screen based on the failure of the EAP authentication is transmitted via the reestablished connection based on the first communication mode.

8. The apparatus according to claim 1, wherein the connection based on the first communication mode is at least one of wireless connection to the other apparatus supporting authentication by a Personal method and wireless connection to the other apparatus by peer-to-peer.

9. The apparatus according to claim 1, wherein the connection based on the second communication mode is at least one of connection to the other apparatus by a wired LAN and connection to the other apparatus by USB.

10. The apparatus according to claim 1, wherein the request is accepted by communication between the communication apparatus and another apparatus.

11. The apparatus according to claim 1, wherein the at least one processor further causes the communication apparatus to transmit, if the EAP authentication succeeds, information for displaying a screen based on the success of the EAP authentication to the information processing apparatus.

12. The apparatus according to claim 1, wherein the at least one processor further causes the communication apparatus display, if the EAP authentication fails, the screen based on the failure of the EAP authentication on a display screen.

13. The apparatus according to claim 1, wherein the setting information includes at least one of information of an authentication method to be used for the EAP authentication, information of a user name to be used for the EAP authentication, information of a password to be used for the EAP authentication, and information of a certificate to be used for the EAP authentication.

14. The apparatus according to claim 1, wherein the information for displaying the setting screen is transmitted to the information processing apparatus by inputting an IP address of the communication apparatus to a Web browser operating on the information processing apparatus.

15. The apparatus according to claim 1, further comprising a printer to execute printing.

16. The apparatus according to claim 1, further comprising a scanner to acquire image data by reading a document.

17. A control method for an information processing apparatus communicable with a communication apparatus, the control method comprising:

displaying a setting screen for accepting an input of setting information concerning Extensible Authentication Protocol (EAP) authentication as authentication based on IEEE802.1X/EAP;

transmitting, to the communication apparatus, the setting information input to the setting screen;

transmitting, to the communication apparatus, a request to execute the EAP authentication; and displaying, based on a failure of EAP authentication with a predetermined authentication server attempted by the communication apparatus based on the setting information input to the setting screen, a screen based on the failure of the EAP authentication, wherein, in a case where the request is accepted in a state in which the communication apparatus operating in a first communication mode is connected to another apparatus, the EAP authentication is attempted after connection based on the first communication mode is disconnected, and wherein, in a case where the request is accepted in a state in which the communication apparatus operating in a second communication mode is connected to the another apparatus, the EAP authentication is attempted without disconnecting connection based on the second communication mode.

18. A control method for a system including an information processing apparatus and a communication apparatus, the control method comprising:

in the communication apparatus, transmitting, to the information processing apparatus, information for displaying a setting screen for accepting an input of setting information concerning Extensible Authentication Protocol (EAP) authentication as authentication based on IEEE802.1X/EAP;

in the information processing apparatus, displaying the setting screen if the information for displaying the setting screen is received, transmitting, to the communication apparatus, the setting information input to the setting screen, and transmitting, to the communication apparatus, a request to execute the EAP authentication;

in the communication apparatus, receiving, from the information processing apparatus, the setting information input to the setting screen, accepting the request, attempting, in a case where the request is accepted, EAP authentication with a predetermined authentication server based on the setting information input to the setting screen, and transmitting, based on a failure of the EAP authentication, information for displaying a screen based on the failure of the EAP authentication to the information processing apparatus; and in the information processing apparatus, displaying, if the information for displaying the screen based on the failure of the EAP authentication is received, the screen based on the failure of the EAP authentication, wherein, in a case where the request is accepted in a state in which the communication apparatus operating in a first communication mode is connected to another apparatus, the EAP authentication is attempted after connection based on the first communication mode is disconnected, and wherein, in a case where the request is accepted in a state in which the communication apparatus operating in a second communication mode is connected to the another apparatus, the EAP authentication is attempted without disconnecting connection based on the second communication mode.

* * * * *